US012739583B2

(12) United States Patent
Bernsee et al.

(10) Patent No.: US 12,739,583 B2
(45) Date of Patent: Sep. 15, 2026

(54) UPMIXING SYSTEMS AND METHODS FOR EXTENDING STEREO SIGNALS TO MULTI-CHANNEL FORMATS

(71) Applicant: ZYNAPTIQ GMBH, Hannover (DE)

(72) Inventors: Stephan M. Bernsee, Karlsruhe (DE); Denis Gökdag, Hannover (DE)

(73) Assignee: ZYNAPTIQ GMBH, Hannover (DE)

( * ) Notice: Subject to any disclaimer, the term of this patent is extended or adjusted under 35 U.S.C. 154(b) by 138 days.

(21) Appl. No.: 18/729,993

(22) PCT Filed: Feb. 22, 2023

(86) PCT No.: PCT/EP2023/054454
§ 371 (c)(1),
(2) Date: Jul. 18, 2024

(87) PCT Pub. No.: WO2023/161290
PCT Pub. Date: Aug. 31, 2023

(65) Prior Publication Data

US 2025/0106577 A1 Mar. 27, 2025

(30) Foreign Application Priority Data

Feb. 23, 2022 (WO) ................. PCT/EP2022/054581

(51) Int. Cl.
*H04S 5/00* (2006.01)
*H04S 7/00* (2006.01)

(52) U.S. Cl.
CPC ................ *H04S 5/005* (2013.01); *H04S 7/30* (2013.01); *H04S 7/40* (2013.01); *H04S 2420/07* (2013.01)

(58) Field of Classification Search
CPC ............... H04S 5/005; H04S 7/30; H04S 7/40
See application file for complete search history.

(56) References Cited

U.S. PATENT DOCUMENTS 9,986,356 B2 5/2018 Horbach et al.
12,417,773 B2 * 9/2025 Baumgarte ........... G10L 19/008
(Continued)

FOREIGN PATENT DOCUMENTS

EP 2730103 B1 4/2019

OTHER PUBLICATIONS

International Search Report and Written Opinion for International Patent Application No. PCT/EP2002/054454 dated May 8, 2023, 14 pages.

(Continued)

*Primary Examiner* — Olisa Anwah
(74) *Attorney, Agent, or Firm* — Dorsey & Whitney LLP

(57) ABSTRACT

The present disclosure describes systems and methods for audio signal processing, and more specifically, techniques for automatically generating surround sound by extending stereo signals including a left and right channel to multi-channel formats in an unsupervised and content-independent or content-agnostic manner. In operation, a computing device may receive a stereo audio input signal containing two channels from a sound source. The computing device may transform the stereo audio input signal into an upmixed multi-channel time domain audio signal to create an immersive surround sound listening experience by wrapping the original stereo field to a higher number of speakers in the frequency domain. Based at least on the continuous mapping and the panning coefficient, the computing device may generate the upmixed multi-channel time domain audio signal.

19 Claims, 11 Drawing Sheets

(56) References Cited

U.S. PATENT DOCUMENTS

| | | | | |
|---|---|---|---|---|
| 2004/0212320 | A1 | 10/2004 | Dowling et al. | |
| 2006/0093152 | A1* | 5/2006 | Thompson .............. | H04S 3/006 381/23 |
| 2006/0093164 | A1* | 5/2006 | Reams ...................... | H04S 3/02 381/23 |
| 2007/0269063 | A1* | 11/2007 | Goodwin .............. | G10L 19/008 381/310 |
| 2008/0232617 | A1* | 9/2008 | Goodwin .............. | G10L 19/008 381/119 |
| 2008/0247555 | A1 | 10/2008 | Avendano et al. | |
| 2009/0060207 | A1 | 3/2009 | Barry et al. | |
| 2010/0296672 | A1* | 11/2010 | Vickers ..................... | H04S 5/00 381/119 |
| 2011/0282674 | A1 | 11/2011 | Ojanperä | |
| 2012/0308015 | A1 | 12/2012 | Ramteke | |
| 2015/0063574 | A1* | 3/2015 | Choi ......................... | H04S 5/00 381/18 |
| 2019/0349704 | A1* | 11/2019 | Warner ................... | H04S 7/302 |

OTHER PUBLICATIONS

International Search Report and Written Opinion for International Patent Application No. PCT/EP2002/054581 dated Oct. 5, 2022, 14 pages.

* cited by examiner

900

UPMIXING SYSTEMS AND METHODS FOR EXTENDING STEREO SIGNALS TO MULTI-CHANNEL FORMATS

CROSS-REFERENCE TO RELATED APPLICATION(S)

This application is the national stage patent application of International Patent Application No. PCT/EP2023/054454 filed with the European Patent Office on Feb. 22, 2023 and titled "UPMIXING SYSTEMS AND METHODS FOR EXTENDING STEREO SIGNALS TO MULTI-CHANNEL FORMATS," and claims benefit and priority to International Patent Application No. PCT/EP2022/054581, titled "UPMIXING SYSTEMS AND METHODS FOR EXTENDING STEREO SIGNALS TO MULTI-CHANNEL FORMATS," filed with the European Patent Office on Feb. 23, 2022, which are incorporated by reference as if fully set forth herein in their entireties.

FIELD

Examples described herein generally relate to audio signal processing, and more specifically, to techniques for automatically generating surround sound by extending stereo signals including a left and right channel to multi-channel formats.

BACKGROUND

Traditionally, stereo recordings consist of sound sources placed in a sound field spanned as a virtual space between two left and right (e.g., L and R) speakers. While this allows for some perceived localization of sound sources for the listener that make them appear to originate from the left and right side of the listener's position, the localization is essentially limited to the sound field spanned by the speakers in front of the listener. Therefore, a number of audio formats exist that place sound sources in a field spanned by more than two speakers, such as 5.1 channel surround, which utilizes two additional rear speakers (e.g., Ls and Rs) for far-left and far-right sounds, as well as a front center channel (e.g., C), often used for dialog.

In many cases, only stereo recordings exist of a given artist's performance, a film mix, or of any other mixed audio recording (no multi-track data of the individual sound elements is available), so creating an immersive, "surround sound" version of such content is not possible by re-mixing the original tracks. Furthermore, many broadcasters require content to conform to multi-channel standards, typically 5.1 surround. Therefore, there exists a need for a process called "upmixing", that allows conversion between stereo and higher channel counts by distributing audio content across the additional channels, or synthesizing plausible signal components for them, or a combination thereof. Due to the large amount of stereo-only content, the diversity of the content itself, and the many use-cases, both automatic/unsupervised, and manual, creatively flexible upmixing methods are needed.

SUMMARY

Aspects and features of the present disclosure are set out in the appended claims.

Overview of Disclosure

An example embodiment includes a method of generating an upmixed multi-channel time domain audio signal. The system receives a stereo signal containing a left input channel and a right input channel and transforms windowed overlapping sections of the stereo signal based at least on a short-time Fast Fourier Transform (s-t FFT) to generate a set of frequency bins for the left input channel and the right input channel. The system generates a two-dimensional positional distribution plotting frequency versus normalized magnitude for the transformed stereo signal to identify a position of each frequency bin in the set of frequency bins. For each frequency bin in the set of frequency bins, the position can comprise a position in a left-right plane. In some examples, the positions of the frequency bins are expressed as angles, such as angles relative to a stereo center line. The system identifies multiple portions of the transformed stereo signal to be extracted, wherein each portion of the transformed stereo signal is identified based on a respective region of interest within the two-dimensional positional distribution. In some implementations, the portions of the transformed stereo signal are identified to be extracted without regard to individual sound sources within the stereo signal, and in some implementations the multiple portions of the transformed stereo signal are identified based solely on a range of locations defined by frequency and positional coordinates relative to the two-dimensional positional distribution. In some implementations, the number of regions of interest is based on the number of the plurality of output components (e.g., unmixed multi-channel output components), such as a number of speakers. The system applies a filtering function to each respective region of interest to extract the multiple identified portions of the transformed stereo signal, wherein the filtering function attenuates the transformed stereo signal outside of the respective region of interest. And the system transforms each of the multiple identified portions of the transformed stereo signal into a time domain output signal to generate the upmixed multi-channel time domain audio signal, wherein the upmixed multi-channel time domain audio signal is used for playback in a multi-channel sound field via a plurality of output components. In some implementations, the method can include providing the upmixed multi-channel time domain audio signal to an audio playback device for playback, such as a stereo system or a surround sound system.

An example embodiment includes a non-transitory computer-readable medium carrying instructions that, when executed by one or more processors, cause a computing system to perform the method of generating an upmixed multi-channel time domain audio signal. The system receives a stereo signal containing a left input channel and a right input channel and transforms windowed overlapping sections of the stereo signal based at least on a short-time Fast Fourier Transform (s-t FFT) to generate a set of frequency bins for the left input channel and the right input channel. The system generates a two-dimensional positional distribution plotting frequency versus normalized magnitude for the transformed stereo signal to identify a position of each frequency bin in the set of frequency bins. For each frequency bin in the set of frequency bins, the position can comprise a position in a left-right plane. In some examples, the positions of the frequency bins are expressed as angles, such as angles relative to a stereo center line. The system identifies multiple portions of the transformed stereo signal to be extracted, wherein each portion of the transformed stereo signal is identified based on a respective region of interest within the two-dimensional positional distribution. In some implementations, the portions of the transformed stereo signal are identified to be extracted without regard to individual sound sources within the stereo signal, and in some implementations the multiple portions of the transformed stereo signal are identified based solely on a range of locations defined by frequency and positional coordinates relative to the two-dimensional positional distribution. In some implementations, the number of the regions of interest is based on the number of the plurality of output components, such as a number of speakers. The system applies a filtering function to each respective region of interest to extract the multiple identified portions of the transformed stereo signal, wherein the filtering function attenuates the transformed stereo signal outside of the respective region of interest. And the system transforms each of the multiple identified portions of the transformed stereo signal into a time domain output signal to generate the upmixed multi-channel time domain audio signal, wherein the upmixed multi-channel time domain audio signal is used for playback in a multi-channel sound field via a plurality of output components. In some implementations, the method can include providing the upmixed multi-channel time domain audio signal to an audio playback device for playback, such as a stereo system or a surround sound system.

In some implementations, the disclosed methods can include generating a visual representation comprising the positions of the frequency bins in the set of frequency bins and positions of each of the identified portions of the transformed stereo signal in the multi-channel sound field. The visual representation can facilitate analysis of relative positions of the frequency bins and the identified portions of the transformed stereo signal in the multi-channel sound field. In these and other implementations, the disclosed methods can include providing the visual representation for display in a user interface. In some examples, the disclosed methods can include modifying a characteristic of the multi-channel sound field in response to a user input via the user interface based on the relative positions of the frequency bins and the identified portions of the transformed stereo signal.

The present application further includes a method for creating an upmixed multi-channel time domain audio signal. The method includes receiving a stereo signal containing a left input channel and a right input channel; transforming, based at least on a short-time Fast Fourier Transform (s-t FFT), one or more windowed, overlapping sections of the stereo signal containing the left input channel and the right input channel, to generate one or more frequency bins for the left input channel and the right input channel; determining a normalised panning coefficient indicative of the relative left and right magnitude relationship corresponding to the contribution of that bin to the position in the stereo field; passing said coefficient through a continuous or discrete mapping function to rotate the virtual sound sources contained in the frequency bins by a predetermined, frequency- and location-dependent amount; subsequently creating magnitudes for additional audio channels by multiplying said panning coefficient with the existing magnitudes or superposition of magnitude for each of the one or more frequency bins in order to extend the left input channel and the right input channel of the stereo signal; and generating, based at least on the continuous mapping and the panning coefficient, an upmixed multi-channel time domain audio signal.

Additionally, a non-transitory computer readable medium encoded with instructions for content evaluation is disclosed. The non-transitory computer readable medium includes transforming, utilizing a short-time Fast Fourier Transform (s-t FFT), a received stereo signal containing the left input channel and the right input channel, to generate a plurality of frequency bins for the left input channel and the right input channel; continuously mapping a magnitude for each of the plurality of frequency bins to a panning coefficient indicative of a channel weight for extending the left input channel and the right input channel of the stereo signal; and generating, based at least on the continuous mapping and the panning coefficient, an upmixed multi-channel time domain audio signal.

The present disclosure describes systems and methods for audio signal processing, and more specifically, techniques for automatically generating surround sound by extending stereo signals including a left and right channel to multichannel formats in an unsupervised and content-independent or content-agnostic manner. In operation, a computing device may receive a stereo audio input signal containing two channels from a sound source. The computing device may transform the stereo audio input signal into an upmixed multi-channel time domain audio signal to create an immersive surround sound listening experience by wrapping the original stereo field to a higher number of speakers in the frequency domain. Based at least on the continuous mapping and the panning coefficient, the computing device may generate the upmixed multi-channel time domain audio signal.

In addition to the exemplary aspects and embodiments described above, further aspects and embodiments will become apparent by reference to the drawings and by study of the following description.

BRIEF DESCRIPTION OF THE DRAWINGS

Reference is now made to the following descriptions taken in conjunction with the accompanying drawings, in which.

SPECIFICATION

Figure 1:
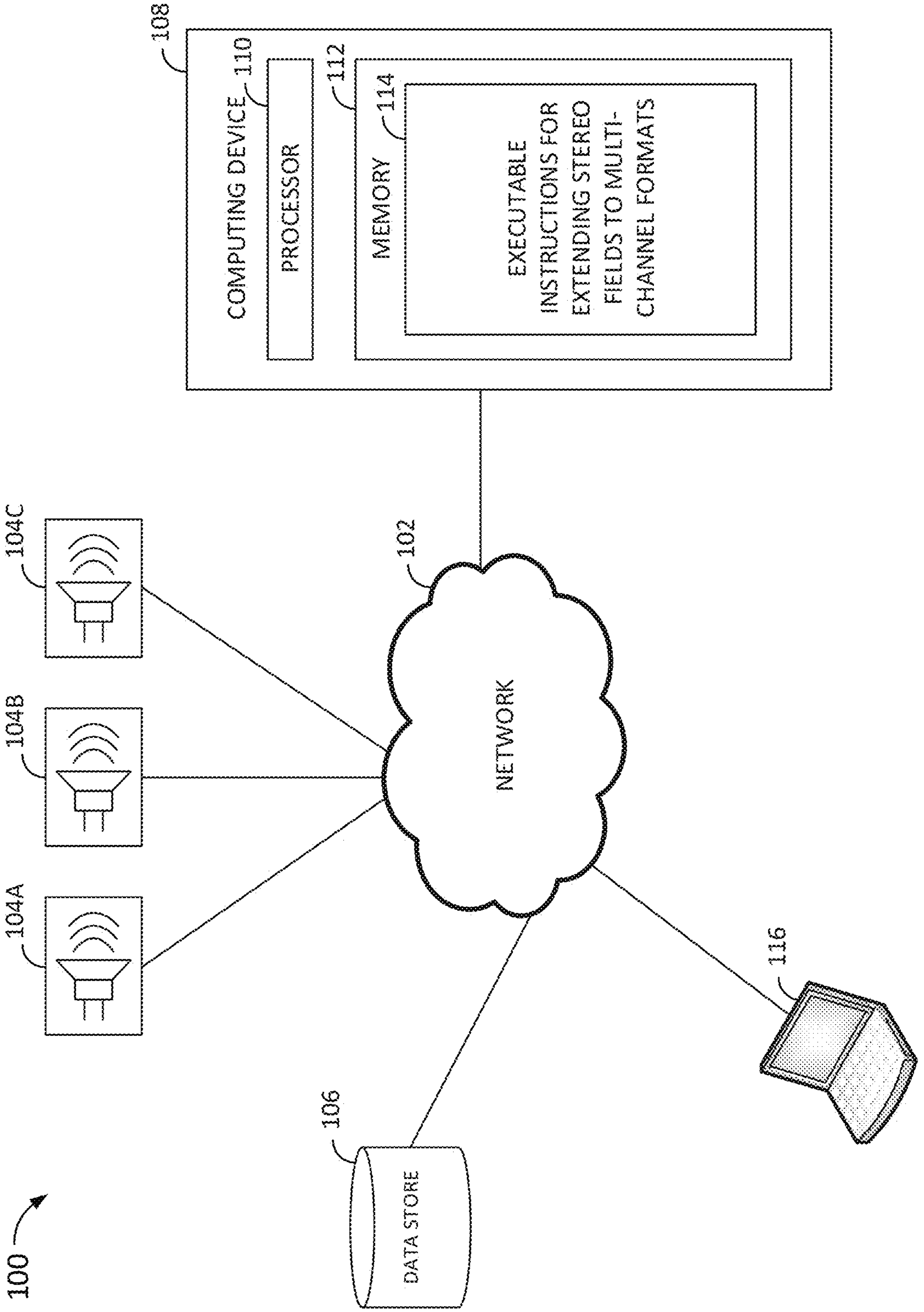
FIG. 1 is a schematic illustration of a system for extending stereo fields into multichannel formats, in accordance with examples described herein.

Certain details are set forth herein to provide an understanding of described embodiments of technology. However, other examples may be practiced without various ones of these particular details. In some instances, well-known computing system components, virtualization components, circuits, control signals, timing protocols, and/or software operations have not been shown in detail in order to avoid unnecessarily obscuring the described embodiments. Other embodiments may be utilized, and other changes may be made, without departing from the spirit or scope of the subject matter presented herein.

The present disclosure includes systems and methods for automatically generating surround sound by extending stereo signals including a left and right channel to multi-channel formats in an unsupervised and content-independent or content-agnostic manner.

For example, various stereo sound sources may generate stereo audio signals within a stereo audio field. In some examples, it would be advantageous to generate surround sound quality audio (or other multi-channel format audio) based at least on using the stereo audio signal produced by the stereo sound source to provide an overall better listening experience to a user. Accordingly, and in examples described herein, computing devices may receive stereo audio signals from one or more sound sources containing a left and a right input channel. These computing devices may transform the stereo audio signals into upmixed multi-channel time domain audio signals for a better (e.g., wrapped, extended, more immersive) listening experience. In some examples, the techniques may include transforming windowed, overlapping sections of the received stereo signals using a short-time Fast Fourier Transform (s-t FFT). This transformation may, in some examples, generate frequency bins for each of the left and right input channels. The computing device may, in some examples, continuously map a magnitude for each of the frequency bins to a panning coefficient indicative of a channel weight for extending the left and right input channels. Based at least on the continuous mapping and the panning coefficient, the computing devices may generate the upmixed multi-channel time domain audio signals for a better (e.g., wrapped, extended, more immersive) listening experience.

As discussed above, traditional stereo recordings consist of sound sources placed in a sound field spanned as a virtual space between two input channels (e.g., a left and a right speaker). This generally allows for some perceived localization of sound sources for a user that makes the audio appear to originate from the left and right side of the user's position. However, this localization is in many cases limited to the sound field spanned by the speakers in front of the user. Due at least in part to the large amount of stereo-only content, the diversity of the content itself, and the many use-cases, both automatic/unsupervised, and manual, creatively flexible upmixing methods are needed.

One current technique creates artificial reverberation (e.g., reverb) to fill the additional side/rear channels with content. More generally, this technique may aim to position the original stereo content in a three dimensional (3D) reverberant space that is then "recorded" with as many virtual microphones as there are speakers in the desired output format. While this approach may generally create a steady sound stage regarding front/rear and side/side imaging (known in the industry as an "in front of the band" sound stage), it is not without its disadvantages.

For example, when played back through a conventional stereo speaker system, a so-called "fold-down" generally occurs, where the channels that exceed stereo are mixed into the L and R speakers to avoid relevant information being lost. If the additional channels contain reverb that was added as part of the upmixing process, fold-down leads to an increased amount of reverb in the front L and R speakers. In other words, using such an upmixing approach may cause the stereo signal after the fold-down stage to not be identical to the original stereo signal before the upmix. As the original stereo signal is typically mixed to sound just right, in most cases, such alteration of the signal during fold-down is perceived as degradation, and is thus undesirable.

Other current upmix techniques have attempted to prevent the above degradation by extracting reverb and/or ambience from the original stereo audio signal instead of adding synthetic audio. In some examples, this may be achieved by placing the extracted reverb/ambience in the rear speakers. However, such technique is also not without its disadvantages. For example, if the reverb is not removed from the audio that is then routed to the L and R, there may be an increased reverb after the fold-down stage. Additionally, if the reverb is removed from the audio routed to the front, imperfections in the detection and filtering used for separation of the two signal components lead to an unstable sound stage, where there is perceived front/back and/or side-to-side movement. This is known as a "spatial flutter" effect, and it may be counter-acted by reducing the amount of separation by means of mixing some of the rear signal back into the front, and vice-versa, or more generally, cross-mixing opposing and adjacent channels to some extent. However, this comes at the expense of a reduced perception of spaciousness and immersion, which is undesirable. Systems and methods described herein combine a stable sound stage with strong separation between speakers and a fold-down stereo product, which in some cases, is identical to the pre-upmix stereo.

Further, in some examples, the aforementioned upmix approaches are further undesirable because they generally create content exclusively for side and rear speakers, but do not create a plausible center channel (e.g., C), which is generally used for speech in film sound, and sung voice and lead instruments in music—but not for diffuse, reverb-like audio. Hence, if creating extra channels using reverb/ambience focused approaches, an additional method is needed to create a plausible C front channel. Furthermore, for scenarios in which the constituent sounds of the mix should be perceived as playing all around a user—known in the industry as an "inside the band" sound stage—this approach also does not suffice.

Moreover, some current processes aim to separate the sound sources contained in the original stereo recording, which is a process generally known as "source separation." This process may create a surround sound stage by (re-) positioning the separated sounds in the sound field. For example, the source separation technique may aim to classify signal components by their specific type of sound, such as speech, then extract those and pan them according to some rule (in case of speech to the C channel, for example). With such "pattern detection"-based methods, imperfections in the classification and separation, such as false negatives or false positives, can lead to undesirable behavior. For example, sounds may alternate or jump between panning positions unexpectedly, drawing the listener's attention to the movement itself, potentially breaking the immersion. In some examples, and particularly for film sound applications, it is undesirable to have a sound play from a position that does not match its visual location on the screen.

Other current techniques include methods for estimating the location of individual sources within a stereo recording. These techniques may be used to attempt to extract such individual sound sources as separate audio streams that can be re-panned to the desired locations within the 5.1, 7.1, or generally: m channel sound field, in a supervised manner. However, an ideal method would not produce unexpected panning effects, produces plausible content for the C channel, would provide a stable sound stage that follows clear panning rules, and would work in an unsupervised manner.

Accordingly, systems and methods described herein generally discuss automatically generating surround sound by extending stereo signals including a left and right channel to multi-channel formats in an unsupervised and content-independent or content-agnostic manner. More specifically, the systems and methods described herein discuss a stereo-to-multi-channel upmixing method that may fold down to the original, unaltered stereo signal while producing a sound stage free of unexpected panning movement, which may also scale to an arbitrary number of horizontal channels, and which may produce plausible audio for the C channel.

According to an example embodiment, the disclosed technology can determine a number of channels to include in a multi-channel signal, which can be based on a number of speakers. The disclosed technology transforms a received stereo signal to generate a number of frequency bins. The frequency bins are plotted to indicate a relative magnitude (e.g., adjusted for total volume of the input signal) and a position of each frequency bin in a left-right sound field. The frequency bin plot uses a normalized magnitude to indicate locations of sound energy, rather than an absolute contribution of each frequency bin to the stereo signal (e.g., loudness). The goal of the plotting of the frequency bins is to determine the location of sound energy in the left-right sound field in the original stereo signal. Once the plot is generated, multiple regions of interest are defined in the left-right sound field, each region of interest corresponding to a channel to be included in the multi-channel signal (e.g., each corresponding to a speaker). In some implementations, the disclosed technology determines the number of channels to include in the multi-channel signal automatically, such as by determining or detecting the number of speakers that will receive the upmixed signals. In some implementations, the number of channels is preset. In some implementations, the disclosed technology determines the number of channels manually, such as based on a user input specifying the number of channels.

To generate an upmixed signal, each region of interest is extracted, such as by using a filter, mask, or aperture to capture only a portion of the signal falling within the respective region of interest. Portions of a signal falling outside of a given region of interest are attenuated using the filter, mask, or aperture. After extracting the respective portions of the signal to include in the upmixed signal, the signal can be converted back to the time domain. This allows a specialized feed whereby sounds within the respective regions of interest are provided to corresponding speakers. For example, sound components in a far left location in an original stereo signal can be extracted and sent to a rear left speaker in an upmixed signal, sound components in a mid-left location can be extracted and sent to a left speaker, sound components in a center location can be sent to a center speaker, sound components in a mid-right location can be sent to a right speaker, and sound components in a far right location can be sent to a rear right speaker. These sound components can be extracted without regard to individual sound sources to avoid problems of existing technologies, as discussed above. Additionally, extracted portions of a signal (e.g., regions of interest) corresponding to respective speakers that receive the upmixed signal can be easily controlled and modified by a user. For example, the disclosed technology can include a visualizer that is displayed in a user interface via which a user can analyze the locations of frequency bins in an original stereo signal relative to regions of interest.

In some implementations, a user can provide inputs via the user interface to modify characteristics of an upmixed signal, such as modifying regions of interest corresponding to particular speakers.

In some examples, the systems and methods described herein use a mapping function derived from a mono sum of the two input channels (e.g., to be used as a phase reference for the upmixed center channel), and left and right channels to extend L, R panning to include two or more rear and side speakers. In some examples, this process may use left, right, and mono spectral magnitudes to determine a weighting function for a panning coefficient that includes an arbitrary amount of additional speakers placed around the listener, i.e., can be scaled to include multiple speakers at different positions. The system components, such as the number of speakers or the like, may be determined by specific system requirements (e.g., a user's actual speaker set up) and can be identified or selected by a user.

In some examples, independent component analysis (ICA) can be used, as further described herein below, which seeks to describe signals based on their statistical independence. In some examples, it may be assumed that signals contained at the center of the stereo image are largely independent from signals contained exclusively at the far-left or far-right edge of the stereo image. However, instead of estimating independent components from the signal vectors' properties, independence criteria may be derived directly from the location(s) of the cues within the stereo image. Accordingly, and in some examples, the techniques described herein separate components based on their independence from the stereo center by assigning an exponential panning coefficient based on signal variance.

In some examples, and operationally, a computing device may receive a stereo signal containing a left input channel and a right input channel. In some examples, the stereo signal containing the left input channel and the right input channel is a recorded signal received from a database. In some examples, the stereo signal containing the left input channel and the right input channel is a live-stream signal received in near real-time from a live event.

The computing device may, based at least on a short-time Fast Fourier Transform (s-t FFT), one or more windowed, overlapping sections of the stereo signal containing the left input channel and the right input channel, to generate one or more frequency bins for the left input channel and the right input channel. In some examples, the computing device may generate a two-dimensional positional distribution plotting frequency versus normalized magnitude for the transformed stereo signal to identify a position in a left-right plane of the one or more frequency bins. The disclosed technology can use a normalized magnitude and not an absolute magnitude (e.g., volume or amplitude) to identify positions of sound energy without regard to overall volume (e.g., loudness) of particular sound components. In some examples, the positions of the frequency bins are expressed as angles, such as angles relative to a stereo center line. In some examples, the computing device may further determine, for each of the each of the frequency bins for the left input channel and the right input channel, the magnitude, a phase, or combinations thereof. In some examples, the determined magnitude may be indicative of a frequency amplitude of a particular frequency bin. In some examples, the computing device may calculate, based at least on the magnitude for each of the frequency bins for the left input channel and the right input channel, a spectral summation. In some examples, the computing device may apply an exponential scaling function to rotate each of the frequency bins for the left input channel and the right input channel. In some examples, the rotation may redistribute each of the frequency bins across a multiple channel speaker array.

Additionally or alternatively, the computing device may identify multiple portions of the transformed stereo signal to be extracted, where each portion of the transformed stereo signal is identified based on a respective region of interest within the two-dimensional positional distribution. In some implementations, the portions of the transformed stereo signal are identified to be extracted without regard to individual sound sources within the stereo signal, and in some implementations the multiple portions of the transformed stereo signal are identified based solely on a range of locations defined by frequency and positional coordinates relative to the two-dimensional positional distribution. In some examples, the number of the regions of interest is based on the number of the plurality of output components (e.g., speakers).

For example, the number of regions of interest can correspond to a number of hardware speakers, which can be a preset number or a number provided by a user. In these and other implementations, the computing device may apply a filtering function to respective regions of interest to extract the multiple identified portions of the transformed stereo signal, where the filtering function attenuates the transformed stereo signal outside of the respective region of interest. For example, the filtering function can be a mask or aperture that removes sounds outside of the respective region of interest and retains sounds within the region of interest.

In some examples, the computing device may transform the multiple identified portions of the transformed stereo signal into a time domain output signal to generate an upmixed multichannel time domain audio signal that can be used for playback in a multi-channel sound field via a plurality of output components. In these and other implementations, the computing device may provide the upmixed multi-channel time domain audio signal to an audio playback device for playback, such as a stereo system or a surround sound system (e.g., such that a user can consume the audio).

In some examples, the computing device generates a visual representation comprising the positions of the frequency bins in the set of frequency bins and positions of each of the identified portions of the transformed stereo signal in the multi-channel sound field. The visual representation can facilitate analysis of relative positions of the frequency bins and the identified portions of the transformed stereo signal in the multi-channel sound field. In these and other implementations, the computing device provides the visual representation for display in a user interface. In some examples, the computing device may modify a characteristic of the multi-channel sound field in response to a user input via the user interface based on the relative positions of the frequency bins and the identified portions of the transformed stereo signal.

In some examples, the computing device may continuously map a magnitude for each of the one or more frequency bins to a panning coefficient indicative of a channel weight for extending the left input channel and the right input channel of the stereo signal. The computing device may, based at least on the continuous mapping and the panning coefficient, generate an upmixed multi-channel time domain audio signal. In some examples, generation of the upmixed multi-channel time domain audio signal by the computing device may be additionally and/or alternatively based at least in part on utilizing the spectral summation and the exponential scaling function.

In some examples, the panning coefficient may be a signal-level independent scalar factor. In some examples, the panning coefficient may be indicative of a stereo localization within a sound field. In some examples, the panning coefficient assigned to one or more frequency bins for the left input channel may be reciprocal to a panning coefficient assigned to one or more of the frequency bins for the right input channel. In some examples, the computing device may invert the panning coefficient for each of the one or more frequency bins for the left input channel and the right input channel. In some examples, the magnitude for each of the one or more frequency bins for the left input channel and the right input channel comprises a left magnitude, a right magnitude, or combinations thereof. In some examples, the phase comprises a left phase, a right phase, or combinations thereof.

In this way, techniques described herein allow for a better user listening experience by extending stereo signals including a left and right channel to multi-channel formats in an unsupervised and content-independent or content-agnostic manner. Further, in various instances, the upmixed signal may be able to account for different output configurations (e.g., different numbers of speakers) and may be tailored to different user preferences as users can select system configurations related to regions of interest for the filtering, e.g., via a display including the mapped signal, such that users can dynamically set output for their system or even particular signals. For example, the signal can be mapped in a two-dimensional graph or plot with the x-axis representing a left-right position of the sound and the y-axis representing a frequency. Bins or points in the mapping represent locations of sound energy in the signal.

The length of the x-axis can depend on the number of channels or speakers, which each correspond to a respective region in the mapping along the x-axis. Sound components within the respective region are then extracted using a filter, mask, or aperture and provided to a particular channel in the signal, and the sound components are then converted back to the time domain to be provided to respective outputs (e.g., speakers).

Turning to the figures, FIG. 1 is a schematic illustration of a system 100 for extending stereo fields into multi-channel formats, in accordance with examples described herein. It should be understood that this and other arrangements and elements (e.g., machines, interfaces, function, orders, and groupings of functions, etc.) can be used in addition to or instead of those shown, and some elements may be omitted altogether. Further, many of the elements described herein are functional entities that may be implemented as discrete or disturbed components or in conjunction with other components, and in any suitable combination and location. Various functions described herein as being performed by one or more components may be carried out by firmware, hardware, and/or software. For instance, and as described herein, various functions may be carried out by a processor executing instructions stored in memory.

System 100 of FIG. 1 includes sound sources 104A, 104B, and 104C (collectively known herein as data source 104), data store 106 (e.g., a non-transitory storage medium), computing device 108, and user device 116. Computing device 108 includes processor 110, and memory 112. Memory 112 includes executable instructions for extending stereo fields to multi-channel formats 114. It should be understood that system 100 shown in FIG. 1 is an example of one suitable architecture for implementing certain aspects of the present disclosure. Additional, fewer, and/or alternative components may be used in other examples. The system 100 can include one or more displays via which outputs can be provided to a user and inputs can be received from a user. For example, the one or more displays can provide a user interface to display visualizations and/or receive user inputs. The one or more displays can be included, for example, in the computing device 108 and/or the user device 116.

It should be noted that implementations of the present disclosure are equally applicable to other types of devices such as mobile computing devices and devices accepting gesture, touch, and/or voice input. Any and all such variations, and any combinations thereof, are contemplated to be within the scope of implementations of the present disclosure. Further, although illustrated as separate components of computing device 108, any number of components can be used to perform the functionality described herein. Additionally, although illustrated as being a part of computing device 108, the components can be distributed via any number of devices. For example, processor 110 may be provided by one device, server, or cluster of servers, while memory 112 may be provided via another device, server, or cluster of servers.

As shown in FIG. 1, sound source 104, computing device 108, and user device 116 may communicate with each other via network 102, which may include, without limitation, one or more local area networks (LANs), wide area networks (WANs), cellular communications or mobile communications networks, Wi-Fi networks, and/or BLUETOOTH® networks. Such networking environments are commonplace in offices, enterprise-wide computer networks, laboratories, homes, educational institutions, intranets, and the Internet. Accordingly, network 102 is not further described herein. It should be understood that any number of user devices and/or computing devices may be employed within system 100 and be within the scope of implementations of the present disclosure. Each may comprise a single device or multiple devices cooperating in a distributed environment. For instance, computing device 108 could be provided by multiple server devices collectively providing the functionality of computing device 108 as described herein. Additionally, other components not shown may also be included within the network environment.

Sound source 104, computing device 108, and user device 116 may have access (via network 102) to at least one data store repository, such as data store 106, which stores data and metadata associated with extending stereo fields into multi-channel formats, including but not limited to executable formulas, techniques, and algorithms for accomplishing such stereo field transformation (e.g., wrapping, extending, etc.) as well as various digital files that may contain stereo or other alternatively formatted audio content. For example, data store 106 may store data and metadata associated with one or more audio, audio-visual, or other digital file(s) that may or may not contain stereo and/or other formatted audio signals. In some examples, data stores 106 may store data and metadata associated with the audio, audio-visual, or other digital file(s) relating to film, song, play, musical, and/or other medium. In some examples, the audio, audio-visual, or other digital file(s) may have been recorded from live events. In some examples, the audio, audio-visual, or other digital file(s) may have been artificially generated (e.g., by and/or on a computing device). In some examples, the audio, audio-visual, or other digital file(s) may be received from and/or have originated from a sound source, such as sound source 104. In other examples, the audio, audio-visual, or other digital file(s) may have been manually added to data store 106 by, for example, a user (e.g., a listener), etc. In some examples, the audio, audio-visual, or other digital file(s) may contain natural sound, artificial sound, or human-made sound.

In some examples, data store 106 may store data and metadata associated with formulas, algorithms, and/or techniques for extending stereo fields into multi-channel formats. In some examples, these formulas, algorithms, and/or techniques may include but are not limited to formulas, algorithms, and/or techniques for generating frequency bins associated with stereo (and/or other) digital audio signals, formulas, algorithms, and/or techniques for generating two-dimensional positional distributions to identify positions of frequency bins, formulas, algorithms, and/or techniques for determining phases, magnitudes, or combinations thereof for one or more frequency bins, formulas, algorithms, and/or techniques for identifying portions of a transformed stereo signal to be extracted based on respective regions of interest in a two-dimensional positional distribution, formulas, algorithms, and/or techniques for applying exponential scaling functions to frequency bins, formulas, algorithms, and/or techniques for determining spectral summations, formulas, algorithms, and/or techniques for applying filtering functions to respective regions of interest to extract identified portions of a transformed stereo signal, formulas, algorithms, and/or techniques for determining panning coefficients and/or continuous mapping as described herein. It should be appreciated that while various formulas, algorithms, and/or techniques are discussed above, any additionally and/or alternative formulas, algorithms, and/or techniques (as well as data and metadata associated therewith) for extending stereo fields into multi-channel formats are contemplated to be stored in data store 106.

In implementations of the present disclosure, data store 106 is configured to be searchable for the data and metadata stored in data store 106. It should be understood that the information stored in data store 106 may include any information relevant to extending stereo fields into multi-channel formats. As should be appreciated, data and metadata stored in data store 106 may be added, removed, replaced, altered, augmented, etc. at any time, with different and/or alternative data. It should further be appreciated that while only one data store is illustrated, additional and/or fewer data stores may be implemented and still be within the scope of this discus lore. Additionally, while only one data store is shown, it should further be appreciated that data store 106 may be updated, repaired, taken offline, etc. at any time without impacting the other data stores (as discussed but not shown).

Information stored in data store 106 may be accessible to any component of system 100. The content and the volume of such information are not intended to limit the scope of aspects of the present technology in any way. Further, data store 106 may be a single, independent component (as shown) or a plurality of storage devices, for instance, a database cluster, portions of which may reside in association with computing device 108, user devices 116, another external computing device (not shown), another external user device (not shown), and/or any combination thereof. Additionally, data store 106 may include a plurality of unrelated data repositories or sources within the scope of embodiments of the present technology. Data store 106 may be updated at any time, including an increase and/or decrease in the amount and/or types of stored data and metadata.

Examples described herein may include sound sources, such as sound source 104. In some examples, sound source 104 may represent a signal, such as, for example, a stereo audio signal. In some examples, sound source 104 may comprise a stream, such as a stream from a playback device or streaming service. In some examples, sound source 104 may comprise a stream, such as an audio file. In some examples, sound source 104 may represent a signal, such as a signal going to one or more speakers. In some examples, sound source 104 may represent a signal, such as a signal coming from one or microphones.

In some examples, sound source 104 may be communicatively coupled to various components of system 100 of FIG. 1, such as, for example, computing device 108, user device 116, and/or data store 106. Sound source 104 may include any number of sound sources, such as a stereo speaker, a floor speaker, a shelf speaker, a wireless speaker, a Bluetooth speaker, a built-in speaker, ceiling speakers, loud speakers, an acoustic instrument, an electric instrument, and the like, capable of outputting (e.g., transmitting, producing, generating, etc. signals, such but not limited to audio signals, stereo audio signals, and the like). In some examples, sound source 104 may include a television set with built in speakers, a boom box, a radio, another use device (such as user device 116) with built in speakers, a cellular phone, a PDA, a tablet, computer, or PC. As should be appreciated, sound source 104 may be any single or number of devices capable of generating and/or producing and/or transmitting stereo audio (and or other formatted audio) signals for use by, for example, computing device 108, to extend to a multichannel extended format for a better listening experience.

As should be appreciated, sound sources as described herein may include physical sound sources, virtual sound sources, or a combination thereof. In some examples, physical sound sources may include speakers that may reproduce an upmixed signal, such that a listener (e.g., a user, etc.) may experience an immersion through the additional channels that may be created from the stereo input. In some examples, virtual sound sources may include apparent sound sources within a mix that certain content seems to (and in in some examples may) emanate from.

As one non-limiting example, in a recording, a violinist may be recorded sitting just off-center to the right. When reproduced through two physical sound sources (e.g., speakers), the sound of the violin may appear to come from (e.g., emanate from) a single position within a stereo image, the position of the "virtual" sound source. As should be appreciated, systems and methods described herein may remap the space spanned by one or more (and in some examples all) virtual sound sources within a mix to an arbitrary number of physical sound sources used to reproduce the recording for the listener (e.g., the user, etc.).

Examples described herein may include user devices, such as user device 116. User device 116 may be communicatively coupled to various components of system 100 of FIG. 1, such as, for example, computing device 108, data store 106, and/or sound source 104. User device 116 may include any number of computing devices, including a head mounted display (HMD) or other form of AR/R headset, a controller, a tablet, a mobile phone, a wireless PDA, touch-enabled and/or touchless-enabled device, other wireless (or wired) communication device, or any other device capable of executing instructions and/or playing upmixed multichannel audio signals as described herein. Examples of user devices 116 described herein may generally implement the receiving of generated upmixed multi-channel audio signal and/or playing the received generated upmixed multi-channel audio signal for, for example, a listener and/or a user.

Examples described herein may include computing devices, such as computing device 108 of FIG. 1. Computing device 108 may in some examples be integrated with one or more user devices, such as user device 116, described herein. In some examples, computing device 108 may be implemented using one or more computers, servers, smart phones, smart devices, tables, and the like. Computing device 108 may implement for extending stereo fields into multi-channel formats. As described herein, computing device 108 includes processor 110 and memory 112. Memory 112 includes executable instructions for extending stereo fields to multichannel formats 114, which may be used to implement the systems and methods described herein. In some embodiments, computing device 108 may be physically coupled to user device 116. In other embodiments, computing device 108 may not be physically coupled user device 116 but collocated with the user devices. In further embodiments, computing device 108 may neither be physically coupled to user device 116 nor collocated with the user devices.

Computing devices, such as computing device 108 described herein may include one or more processors, such as processor 110. Any kind and/or number of processor may be present, including one or more central processing unit(s) (CPUs), graphics processing units (GPUs), other computer processors, mobile processors, digital signal processors (DSPs), microprocessors, computer chips, and/or processing units configured to execute instructions and process data, such as executable instructions for extending stereo fields into multi-channel formats 114.

Computing devices, such as computing device 108, described herein may further include memory 112. Any type or kind of memory may be present (e.g., read only memory (ROM), random access memory (RAM), solid-state drive (SSD), and secure digital card (SD card)). While a single box is depicted as memory 112, any number of memory devices may be present. Memory 112 may be in communication (e.g., electrically connected) with processor 110. In many embodiments, the memory 112 may be non-transitory.

Memory 112 may store executable instructions for execution by the processor 110, such as executable instructions for extending stereo fields into multi-channel formats 114. Processor 110, being communicatively coupled to user device 116, and via the execution of executable instructions for extending stereo fields into multi-channel formats 114, may transform received stereo audio signals from a sound source, such as sound source 104, analyze textual content received from a user device, such as user devices 116, into frequency bins, continuously map a magnitude for each of the frequency bins to a panning coefficient, and generate an upmixed multi-channel time domain audio signal.

In operation, to automatically generate surround sound by extending stereo signals including a left and right channel to multi-channel formats in an unsupervised and content-independent or content-agnostic manner, processor 110 of computing device 108 may execute executable instructions for extending stereo fields to multi-channel formats 114.

In some examples, processor 110 of computing device 108 may execute executable instructions for extending stereo fields to multi-channel formats 114 to receive a stereo signal containing a left input channel and a right input channel. In some examples, the stereo signal containing the left input channel and the right input channel is a recorded signal received from a database. In some examples, and as described herein, the stereo signal containing the left input channel and the right input channel is a live-stream signal received in near real-time from a live event. In some examples, the stereo signal may be received from a sound source, such as sound source 104 as described herein.

In some examples, processor 110 of computing device 108 may execute executable instructions for extending stereo fields to multi-channel formats 114 to generate, based at least on utilizing a short-time Fast Fourier Transform (s-t FFT) on one or more windowed, overlapping sections of the stereo signal containing the left input channel and the right input channel, one or more frequency bins for the left input channel and the right input channel. In some examples, the computing device may further determine, for each of the one or more frequency bins for the left input channel and the right input channel, a magnitude, a phase value, or combinations thereof. In some examples, the determined magnitude may be indicative of a frequency amplitude of a particular frequency bin. As one example, a single original stereo audio stream (containing two channels, e.g., a right channel and a left channel) may be transformed using an s-t FFT on windowed, overlapping sections of the input signal (e.g., see FIG. 3). From each transform, short-term instantaneous magnitudes (e.g., M_left, M_right, and phases P_left, P_right) may be calculated for each bin k of the two stereo channels.

In some examples, the computing device may calculate, based at least on the magnitude for each of the one or more frequency bins for the left input channel and the right input channel, a spectral summation. In some examples, the spectral summation may be calculated by adding each bin k from both the right and the left channel and dividing by two.

$$\text{M\_sum}[k] = (\text{M\_left}[k] + \text{M\_right}[k])/2 \quad \text{Equation (1)}$$

As should be appreciated, in some examples, for stereo audio signals located at the center of a stereo image, M_sum[k] may be identical to both M_left[k] and M_right[k] components of Equation (1). Alternatively, in some examples, for signals located on either side of the stereo image, e.g., for components only present in the left or right channel, the center component may contain half as much energy as the side component. In some examples, there may always be a mixture of side and center signals in a mix. As a result, for magnitudes normalized to be in the 0 . . . 1 interval, the maximum of the absolute difference between side and center channel magnitude may be in the 0.5×-1.0× interval.

In some examples, in order to determine the panning position for each of the magnitude bins in a representation that may be a scalar factor independent of signal level, the absolute difference between side and sum for L and R channels may be normalized by dividing through the sum for that bin magnitude.

$$\text{p\_L}[k] = |\text{M\_left}[k] - \text{M\_sum}[k]|/\text{M\_sum}[k]; \quad (\text{M\_sum}[k] \neq 0) \quad \text{Equation (2a)}$$

$$\text{p\_R}[k] = |\text{M\_right}[k] - \text{M\_sum}[k]|/\text{M\_sum}[k]; \quad (\text{M\_sum}[k] \neq 0) \quad \text{Equation (2b)}$$

As a result, per-bin panning coefficients pL, pR may be derived that take on the value $$|1 - 0.5|/0.5 = 1 \quad \text{Equation (3a)}$$

for signals that may be located in the left or right channels only, and $$|1 - 1|/1 = 0 \quad \text{Equation (3b)}$$

for signals that may be located dead center in the stereo image. Because this operation may be calculated for each of the two stereo channels, the resulting panning coefficients may, in some cases, be reciprocal.

In some implementations, M_sum[k] may be directly multiplied with p_L[k] and p_R[k] to yield the original input bin magnitudes for L and R channels.

In some examples, the computing device may apply an exponential scaling function E to both p_L[k] and/or p_R[k] to shift the position of each of the one or more frequency bins for the left input channel and the right input channel. In some examples, this shift may redistribute each of the one or more frequency bins across a multiple channel speaker array, rotating the apparent position of the virtual sound source to the rear speaker channels.

$$\text{M\_left\_ex}[k] = \text{M\_sum}[k] * (1 - \text{p\_L}[k]\text{^}E) \quad \text{Equation (4)}$$

$$\text{M\_right\_ex}[k] = \text{M\_sum}[k] * (1 - \text{p\_R}[k]\text{^}E) \quad \text{Equation (5)}$$

In some examples, the computing device may split the stereo image into four channels by using Eqs (4) and (5) for the front L and R channels, and by calculating the difference between the original, unmodified stereo image and the rotated image as $$\text{M\_left\_rear}[k] = \text{M\_left}[k] - \text{M\_left\_ex}[k] \quad \text{Equation (6)}$$

$$\text{M\_right\_rear}[k] = \text{M\_right}[k] - \text{M\_right\_ex}[k] \quad \text{Equation (7)}$$

where M_left_rear[k] and M_right_rear[k] are limited to positive numbers only, and are used as the Ls and Rs (left and right rear side channels) reproduced through separate physical speakers.

In some examples, processor 110 of computing device 108 may execute executable instructions for extending stereo fields to multi-channel formats 114 to continuously map a magnitude for each of the one or more frequency bins to a panning coefficient indicative of a channel weight for extending the left input channel and the right input channel of the stereo signal.

In some examples, processor 110 of computing device 108 may execute executable instructions for extending stereo fields to multi-channel formats 114 based at least on the continuous mapping and the panning coefficient, generate an upmixed multi-channel time domain audio signal. In some examples, generation of the upmixed multi-channel time domain audio signal by the computing device may be additionally and/or alternatively based at least in part on utilizing the spectral summation and the exponential scaling function.

In some examples, the exponential scaling function E applied to the panning coefficients p_L and p_R may be a signal-level independent scalar factor. In some examples, the value E in Eqs (4) and/or (5) may be set manually by a developer and/or an operator, etc. In some examples, the value of E may be set based in part on (and/or depending on) the number of output channels (e.g., speakers, etc.). In some examples, the panning coefficient may be indicative of a stereo localization within a sound field. In some examples, the panning coefficient assigned to one or more frequency bins for the left input channel may be reciprocal to a panning coefficient assigned to one or more of the frequency bins for the right input channel. In some examples, the computing device may invert the panning coefficient for each of the one or more frequency bins for the left input channel and the right input channel. In some examples, such inversion may ensure that a unit value for panning denotes the center of the stereo field. In some examples, the magnitude for each of the one or more frequency bins for the left input channel and the right input channel, comprises a left magnitude, a right magnitude, or combinations thereof. In some examples, the phase comprises a left phase, a right phase, or combinations thereof.

As should be appreciated, information in p_L and p_R per magnitude bin may generally indicate that bin's contribution to the stereo field. In some examples, each bin's magnitude value for L and R channels may determine its position in a stereo field. For example, a bin containing only energy in the left channel may correspond to a sound source that is panned far-left, while a bin that has equal amounts of energy in L and R magnitudes may belong to a sound source located at the center.

As described, the panning coefficient indicates where the component will be localized in the original stereo mix. It should be noted that the stereo mix may be treated as an array of magnitudes that are getting varying contributions from the original sound sources within the mix. In contrast to current and traditional methods, no attempt is made to identify or extract the underlying sound sources from the panning coefficient. Additionally, whether that contribution is to either the left or right channel is not a factor, and instead, knowledge of how much that bin contributes to both center and side distributions in the signal is of value (e.g., using, for examples, one or more of Eqs (1)-(3b)). Moreover, and in contrast to current and traditional methods, no attempt is made to perform pattern detection to identify, e.g. dialog, as a specific sound source. Further, no attempt is made to look at the statistics of the magnitude distribution for the L/R bins to identify sound sources by the location of their energy in the stereo field.

In some examples, when comparing the systems and methods described herein to the ICA approach, the present approach minimizes mutual information contained in the center and side magnitudes by separating them based on their independence from their combined distribution. In other words, the panning coefficient may be a measure for the individual bin's contribution to either center or side distributions.

In some examples, and as described herein, in order to re-pan the stereo image and derive content for the additional channels that can be reproduced on playback an exponential scaling function may be used to rotate the L/R bin vectors to redistribute the individual bin contributions across the m-channel speaker array.

In some examples, to compute the final magnitude from the panning coefficient the magnitude sum at bin k in each of the stereo channels may be multiplied by the panning coefficient for that channel. In some examples, if this multiplication is completed without modifying the panning coefficient, for instance, in order to display panning information for that component on a computer screen, the original input signal may result.

As should be appreciated, various examples and implementations of the described systems and methods are considered to be within the scope of this disclosure. Four non-limiting example implementations for six channels (e.g., 5.1 format) are illustrated below. More specifically, the following example demonstrates a 5.1 channel configuration to further illustrate the techniques described herein. Other multi-channel implementations are possible by using different values for the exponential scaling function E for each additional speaker pair.

Example 1

In a 5.1 surround set-up, the resulting m-channel components in the extended m-channel field M_left_ex and M_right_ex may be computed from both left (L) and right (R) channel magnitudes, as well as the sum of both L and R magnitudes M_sum, at FFT magnitude bin k, as per the following:

$$\text{M\_left\_ex}[k] = \text{M\_sum}[k] * \left(1 - \left(|(\text{M\_left}[k] - \text{M\_sum}[k])|/\text{M\_sum}[k]\right)^{\wedge} E\right) \quad \text{Equation (8)}$$

$$\text{M\_right\_ex}[k] = \text{M\_sum}[k] * \left(1 - \left(|(\text{M\_right}[k] - \text{M\_sum}[k])|/\text{M\_sum}[k]\right)^{\wedge} E\right) \quad \text{Equation (9)}$$

where, for example, a value of the exponential scaling function E=0.14 is used to generate panning coefficients for all center information and E=1 for Ls/Rs and E=0.35 for L/R channels, respectively. The resulting magnitudes may be limited to positive numbers only.

Example 2

In another implementation, on a more general level, a one-dimensional mapping may be used to map normalized bin magnitude difference between L and R channels directly to a single panning coefficient (e.g., P[k]).

$$P[k] = |\text{M\_right}[k] - \text{M\_left}[k]|/\text{M\_sum}[k] \quad \text{Equation (10)}$$

In some examples, this panning coefficient P[k] can be scaled non-linearly to shift the apparent position of the virtual sound source in the mix to another physical output channel.

$$\text{M\_left\_front}[k] = \text{M\_left}[k] * F[P[k]] \quad \text{Equation (11)}$$

$$\text{M\_right\_front}[k] = \text{M\_right}[k] * F[P[k]] \quad \text{Equation (12)}$$

$$\text{M\_left\_rear}[k] = \text{M\_left}[k] * G[P[k]] \quad \text{Equation (13)}$$

$$\text{M\_right\_rear}[k] = \text{M\_right}[k] * G[P[k]] \quad \text{Equation (14)}$$

where F[*] and G[*] denote mapping functions 0<F[x]<1 that may in some implementations be reciprocal, eg G[x]=1-F[x].

In another implementation, F[x] may be a linear ramp from x=0, y=0 to x=1, y=1, and G[x] may be an inverse linear ramp, ie. from x=0, y=1 to x=1, y=0

In some examples, the actual mapping between L/R difference and panning coefficient P[k] may determine the weighting for the C, L, R, Ls and Rs channels. In some examples, the mapping function F[x], G[x] may be continuous, or discrete, the latter may be efficiently implemented via a lookup table (LUT).

Example 3

In another example, rate-independent hysteresis may be added to the panning coefficients P[k] such that P[k] is dependent on past values and on the directionality of the change. As used herein, hysteresis is a process that derives an output signal y(x) in the 0 . . . 1 range from an input signal x, also in the 0 . . . 1 range, by the following relationship:

$$(I)\text{: } y(x) = 1;\ \text{if } (x >= \text{beta});\ \text{note: alpha} < \text{beta} \quad \text{Equation (15)}$$

$$(II)\text{: } y(x) = 0;\ \text{if } (x <= \text{alpha}) \quad \text{Equation (16)}$$

$$(III)\text{: } y(x) = v;\ \text{otherwise} \quad \text{Equation (17)}$$

where v=0 if the last condition #(III) that was true was (II), and v=1 if the last condition that was true was (I). In this implementation, the actual values for P[k] replace the upper boundary value 1.

Example 4

In another example, either separately or combined with Example 3, low-pass filtering may be added so the resulting coefficients are smoothed over time. This stage may be typically characterized by adjustable attack and decay factors "atk" and "dcy", such that:

$$y(x) = (atk * y(x) + x)/(atk + 1);\ \text{if } (x > y(x)) \quad \text{Equation (18)}$$

$$y(x) = (dcy * y(x) + x)/(dcy + 1);\ \text{otherwise} \quad \text{Equation (19)}$$

In the case of the monophonic center channel, both center channel results may be subsequently added to yield the final M_center signal. The resulting phase may be taken from either L or R channels or from a transformed sum of both L+R channels.

Generated multi-channel output magnitudes for each side may be combined with the phase information for the same side, respectively, to yield the final transform for each of the m-channels. As described herein, the transform may be inverted and results are overlap-added with adjustable gain factors to yield the final time domain audio stream consisting of the m-channels that can subsequently be reproduced through any given surround setup.

As a result, systems and methods descried herein use techniques for extracting spatial cues from a stereo signal for the purpose of extending stereo (L, R) recordings to multi-channel format (e.g., "5.1" format=6 channels; channels designated L, R, Ls, Rs, C, Lfe), or generally m-channel recordings. This allows automatic generation of a true, immersive surround sound from stereo recordings in an unsupervised and content-independent or content-agnostic manner.

Figure 2A:
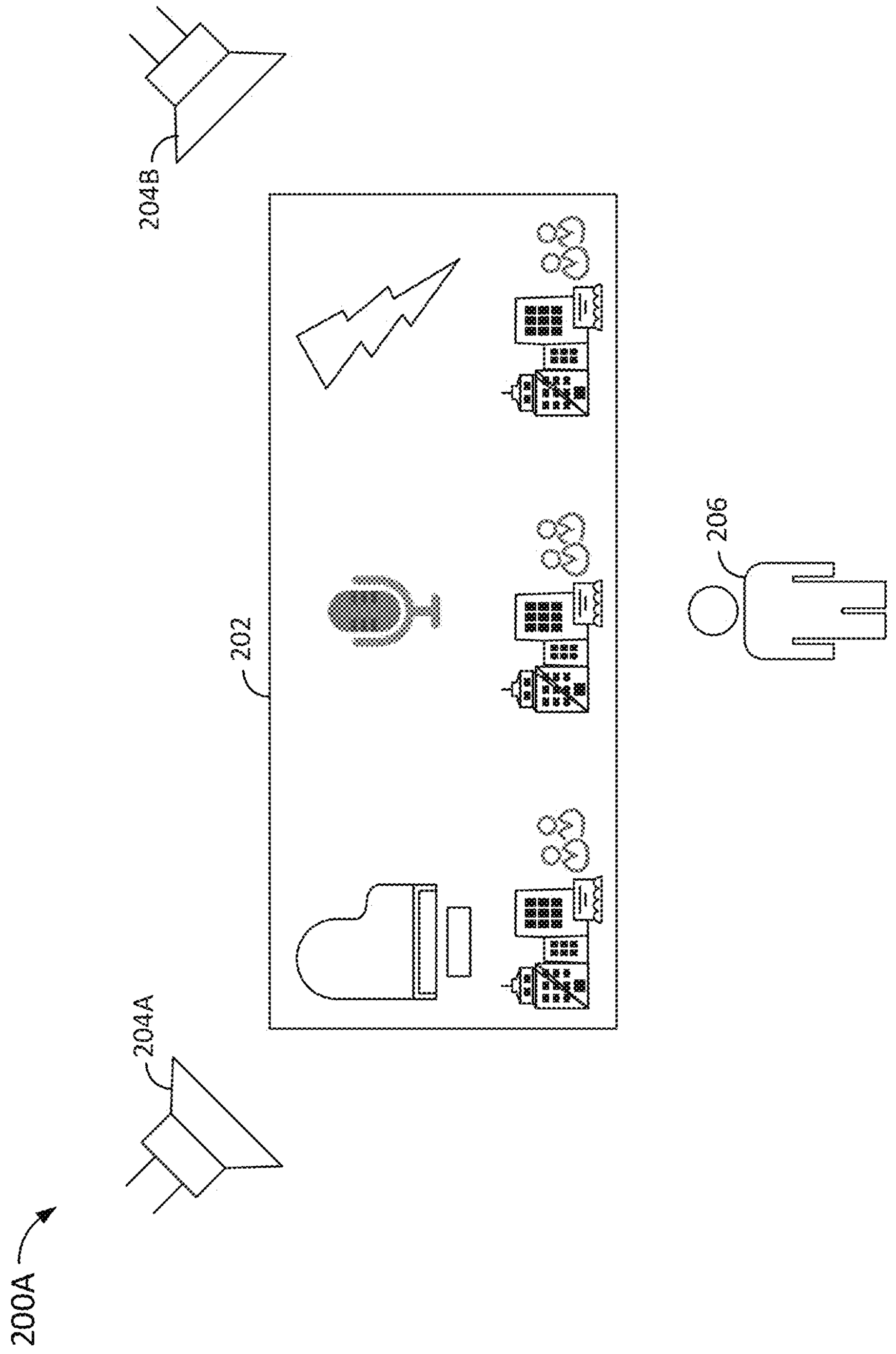
FIG. 2A is an example schematic illustration of a traditional stereo field, in accordance with examples described herein.

Now turning to FIG. 2A, FIG. 2A is an example schematic illustration of a traditional stereo field 200A, in accordance with traditional methods as described herein. Traditional stereo field 200A includes stereo image 202, sound output devices 204A and 204B, and user 206. In some examples, stereo image 202 may include various noise, such as instrumental noise, human noise, noise from nature, city noise, and the like that may in some examples be produced by sound output devices 204A and 204B. In some examples, and as described herein, sound output devices 204A and 204B may include but are not limited to a stereo speaker, a floor speaker, a shelf speaker, a wireless speaker, a Bluetooth speaker, a built-in speaker, ceiling speakers, loud speakers, an acoustic instrument, an electric instrument, and the like. In some examples, sound output devices 204A and 204B may include a television set with built in speakers, a boom box, a radio, another use device (such as user device 116 of FIG. 1) with built in speakers, a cellular phone, a PDA, a tablet, computer, a PC, and the like.

As illustrated in FIG. 2A, sound output devices 204A and 204B may be generating sound for user 206 to experience. However, the traditional stereo field 200A that utilizes a two channel stereo field, user 206 may only be experiencing a low quality listening experience. Here, the traditional methods are unable to extend (e.g., wrap, etc.) the sound around user 206 to create an immersive listening experience.

Figure 2B:
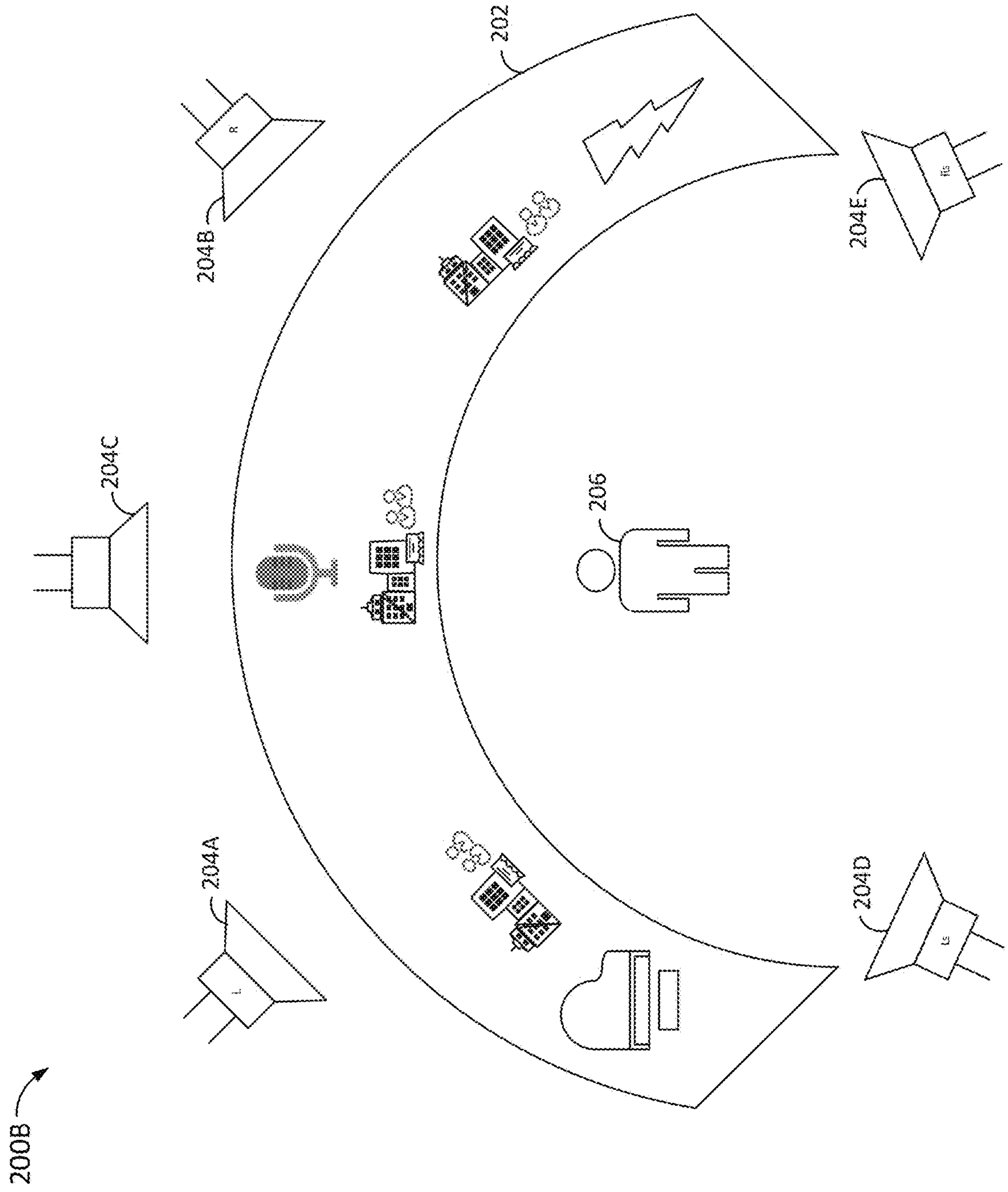
FIG. 2B is an example schematic illustration of a wrapped stereo field that has been extended into a multi-channel format, in accordance with examples described herein.

Now turning to FIG. 2B, and in contrast to FIG. 2A, FIG. 2B is an example schematic illustration of a wrapped stereo field that has been extended into a multi-channel format, in accordance with examples described herein. Wrapped stereo field 200B includes stereo image 202, sound output devices 204A, 204B, 204C, 204D and 204E, and user 206. In some examples, stereo image 202 may include various noise, such as instrumental noise, human noise, noise from nature, city noise, and the like that may in some examples be produced by sound output devices 204A, 204B, 204C, 204D and 204E. In some examples, and as described herein, sound output devices 204A, 204B, 204C, 204D and 204E may include but are not limited to a stereo speaker, a floor speaker, a shelf speaker, a wireless speaker, a Bluetooth speaker, a built-in speaker, ceiling speakers, loud speakers, an acoustic instrument, an electric instrument, and the like. In some examples, sound output devices 204A, 204B, 204C, 204D and 204E may include a television set with built in speakers, a boom box, a radio, another use device (such as user device 116 of FIG. 1) with built in speakers, a cellular phone, a PDA, a tablet, computer, a PC, and the like. The sound output devices can comprise output components via which an upmixed multi-channel time domain audio signal is used for playback in a multichannel sound field (e.g., the wrapped stereo field 200B). The upmixed multi-channel time domain audio signal can be provided to an audio playback device for playback via the sound output devices 204A, 204B, 204C, 204D and 204E, such as a stereo system or a surround sound system. In some implementations, the number of sound output devices 204A, 204B, 204C, 204D can be received by the disclosed system (e.g., as a user input) and used to determine a number of regions of interest. The disclosed system can also receive other information about the configuration of the wrapped stereo field 200B, such as locations of the sound output devices 204A, 204B, 204C, 204D.

As illustrated in FIG. 2B, sound output devices 204A and 204B may be generating (e.g., transmitting, producing, re-producing, etc.) sound for user 206 to experience by wrapping (e.g., extending) by upmixing the stereo audio signal into multi-channel format, thereby extending the sound to the far left (Ls) and far right (Rs) regions of the rear speakers, such as 204D and 204E. They may also be in extending the sound to the center region of the center (C) speaker, such as speaker 204C. This may be accomplished using systems and methods described herein. Additionally, and as noted throughout, in some examples, this may be an automatic (e.g., blind) process that, in some cases, may not depend on the number of sound output devices (or sound sources) or an estimate of their locations within the stereo image.

As should be appreciated, and as used herein, in some examples, "blind" may refer to not trying to determine the actual location of the virtual sound source within a mix by looking at the bins to see which ones correspond to a given sound source. Rather, in some examples, "blind" may refer to determining the amount by which that bin is shifted to its new output channel from (e.g., based on) its contribution to the left and right input channels. In some examples, and as used herein, "blind" may refer to Also, "blind" the user not having to give the algorithm any additional information.

Figure 3:
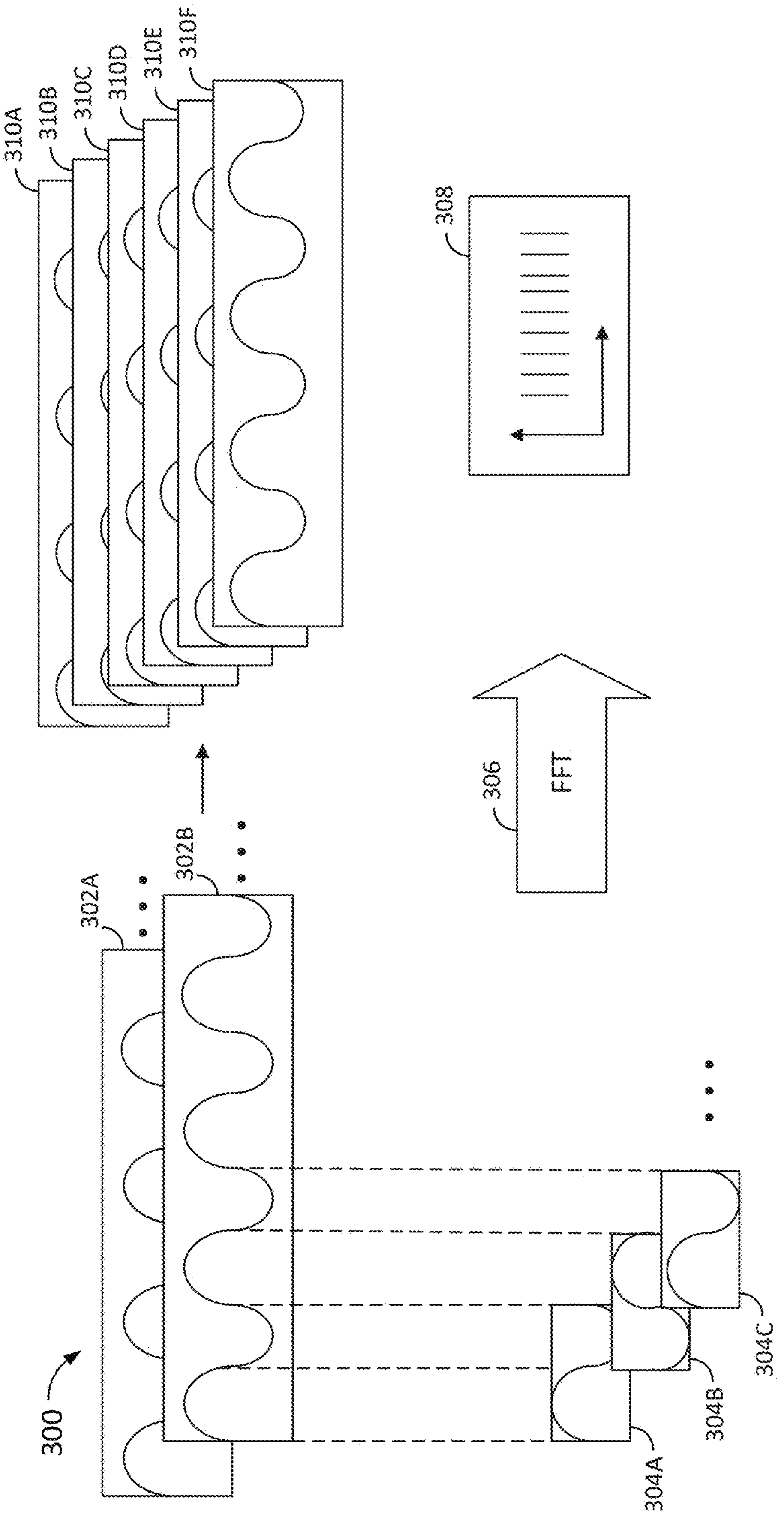
FIG. 3 is an example schematic illustration of a transformed stereo audio signal using windowed, overlapping short-time Fourier transforms, in accordance with examples described herein.

Now turning to FIG. 3, FIG. 3 is an example schematic illustration 300 of a transformed stereo audio signal using windowed, overlapping short-time Fourier transforms, in accordance with examples described herein. Schematic illustration 300 of a transformed stereo audio signal includes stereo input audio signals 302A and 302B (collectively known herein as input audio signal 302, which may, in some examples, include two stereo channels), windowed, overlapping sections 304A-304C, short-term Fast Fourier Transform 306, magnitude spectrum 308, and output streams 310A-310F (which may, in some examples, include 6 (5.1) output streams). As noted throughout, the systems and methods described herein generate an upmixed multi-channel time domain audio signal by transforming a stereo input audio signal, such as stereo input audio signal 302. Here, as illustrated, s-t FFT 306 is performed on windowed, overlapping sections 304A-304C of stereo input audio signal 302. As an output, a magnitude spectrum, such as magnitude spectrum 308 results. In some examples, magnitude spectrum may include frequency (e.g., magnitude bins as discussed herein). In some examples, a computing device, such as computing device 108 of FIG. 1 may continuously map a magnitude for each of the one or more frequency bins to a panning coefficient indicative of a channel weight for extending the left input channel and the right input channel of the stereo signal. In some examples, based at least on the continuous mapping and the panning coefficient, the computing device, such as computing device 108 of FIG. 1, may generate an upmixed multichannel time domain audio signal.

In some examples, the magnitude spectrum 308 can comprise a mapping or two-dimensional positional distribution, which plots frequency versus normalized magnitude for the transformed stereo signal to identify positions of frequency bins, such as frequency bins in the magnitude spectrum 308. Multiple portions of the transformed stereo signal can then be identified to be extracted based on respective regions of interest in the two-dimensional positional distribution, and a filtering function can be applied to each respective region of interest to extract the multiple portions. The extracted portions of the transformed stereo signal can then be used to generate the upmixed multi-channel time domain audio signal. For example, each extracted portion of the transformed stereo signal can correspond to a respective output component, such as a respective one of the sound output devices 204A, 204B, 204C, 204D and 204E of FIG. 2.

Figure 4A:
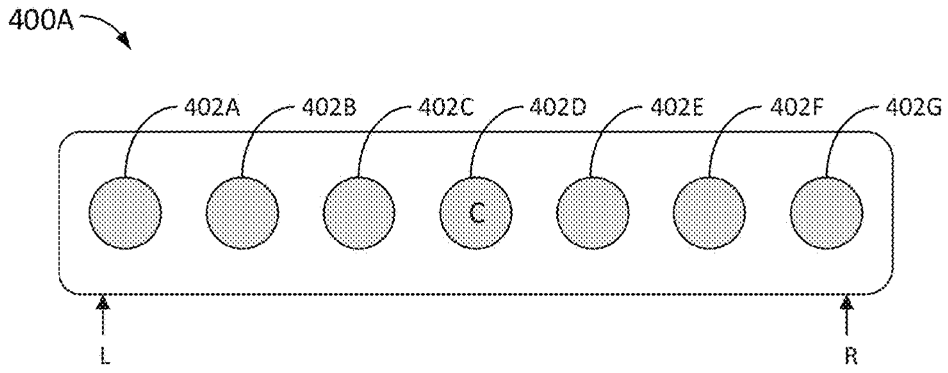
FIG. 4A is an example schematic illustration of perceived sound location within a traditional stereo field, in accordance with examples described herein.

Now turning to FIG. 4A, FIG. 4A is an example schematic illustration 400A of perceived sound location within a traditional stereo field, in accordance with traditional methods as described herein. Schematic illustration 400A of perceived sound location within a traditional stereo field includes input sound sources (e.g., channels) 402A-402G. As described herein, traditional methods of audio signal processing and sound emersion are unable to extend (e.g., wrap, upmix, etc.) stereo audio signals to generate a multi-channel, surround sound experience. As illustrated, input sound sources (e.g., channels) 402A-402G are perceived by a user as only left and right.

Figure 4B:
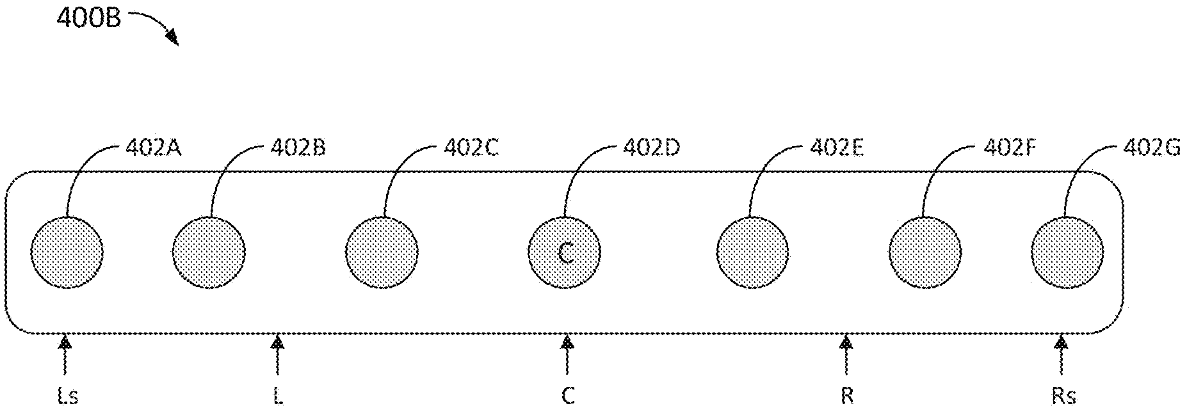
FIG. 4B is an example schematic illustration of perceived sound location within an extended stereo field, in accordance with examples described herein.

Now turning to FIG. 4B, FIG. 4B is an example schematic illustration 400B of perceived sound location within an extended stereo field, in accordance with examples described herein. Schematic illustration 400B of perceived sound location within an extended stereo field also includes input sound sources (e.g., channels) 402A-402G, however, farther spaced apart than in schematic illustration 400A. As described herein, systems and methods described herein extend (e.g., wrap, upmix, etc.) stereo audio signals to generate a multichannel, surround sound experience. As a result, the audio may extend to more than just the left and right speakers. As illustrated in schematic illustration 400B of perceived sound location within an extended stereo field, the audio has been extended (e.g., wrapped, etc.) to the far left (Ls), left (L), center (C), right (R), and far right (Rs) channels. As a result, a user (e.g., listener) have experience a more immersive, surround listening environment. In some implementations, each channel Ls, L, C, R, and Rs can correspond to a respective region of interest within a two-dimensional positional distribution of a transformed stereo signal, and each channel Ls, L, C, R, and Rs can contain a corresponding extracted portion of the transformed stereo signal. As described herein, the corresponding extracted portion of the transformed stereo signal can be extracted by applying a filtering function to each respective region of interest. The filtering function can comprise a mask or aperture applied to the signal, whereby sounds are attenuated outside of the region of interest and retained within the region of interest. The filtering function can be applied in a tapering manner to the region of interest.

Figure 5:
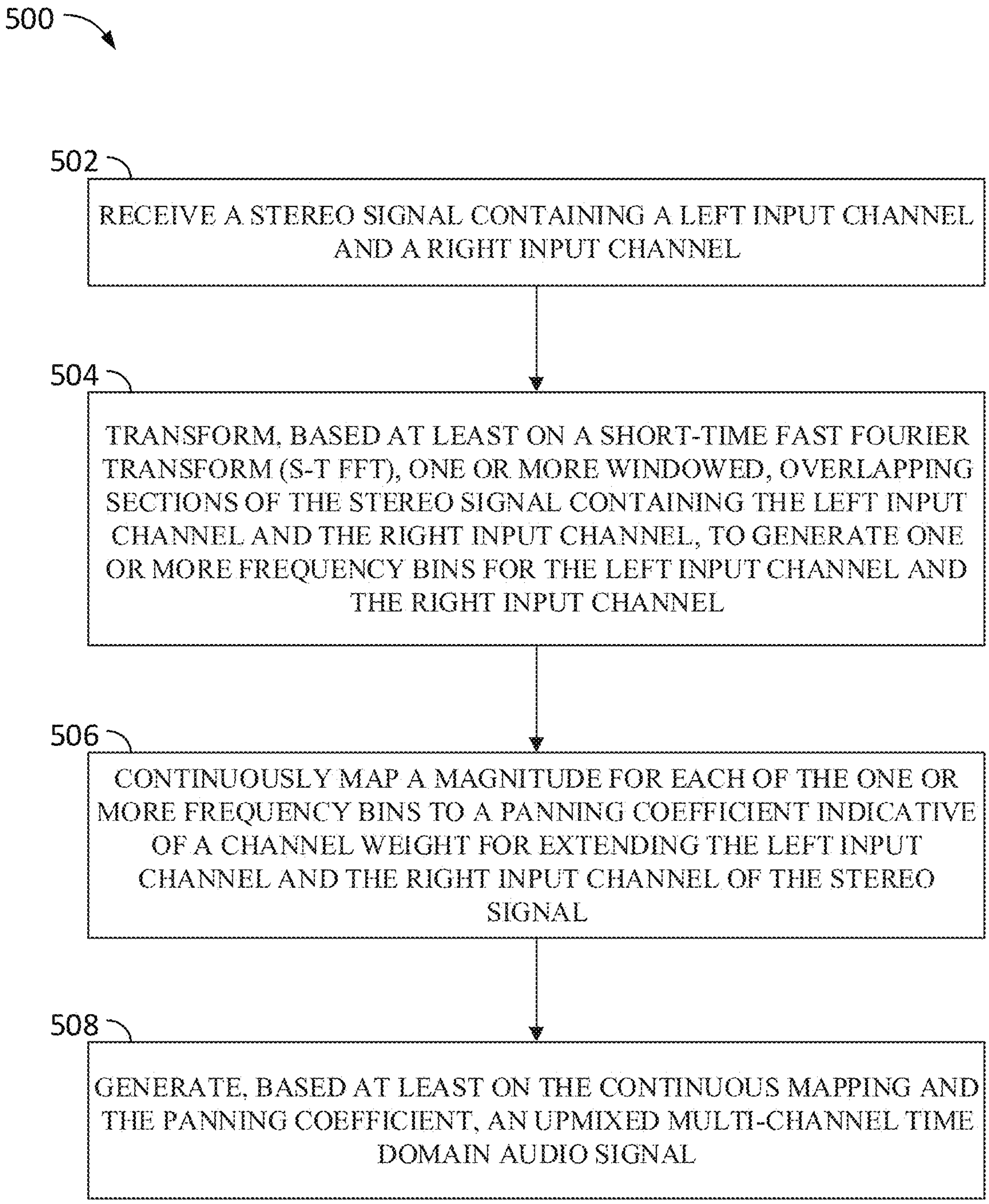
FIG. 5 is a flowchart of a method for extending stereo fields into multi-channel formats, in accordance with examples described herein.

Now turning to FIG. 5, FIG. 5 is a flowchart of a method 500 for extending stereo fields into multi-channel formats, in accordance with examples described herein. The method 500 may be implemented, for example, using the system 100 of FIG. 1.

The method 500 includes receiving a stereo signal containing a left input channel and a right input channel in step 502; transforming, based at least on a short-time Fast Fourier Transform (s-t FFT), one or more windowed, overlapping sections of the stereo signal containing the left input channel and the right input channel, to generate one or more frequency bins for the left input channel and the right input channel in step 504; continuously mapping a magnitude for each of the one or more frequency bins to a panning coefficient p_L[k] and p_R[k] from Eqs 2a,b or P[k] from Eq 10 indicative of a channel weight for extending the left input channel and the right input channel of the stereo signal in step 506; and generating, based at least on the continuous mapping and the panning coefficient, an upmixed multi-channel time domain audio signal in step 508.

Step 502 includes receiving a stereo signal containing a left input channel and a right input channel. In some examples, the stereo signal containing the left input channel and the right input channel is a recorded signal received from a database. In some examples, the stereo signal containing the left input channel and the right input channel is a live-stream signal received in near real-time from a live event or other sound generation event.

Step 504 includes transforming, based at least on a short-time Fast Fourier Transform (s-t FFT), one or more windowed, overlapping sections of the stereo signal containing the left input channel and the right input channel, to generate one or more frequency bins for the left input channel and the right input channel. As described herein, in some examples, the computing device may further determine, for each of the each of the one or more frequency bins for the left input channel and the right input channel, the magnitude, a phase, or combinations thereof. In some examples, the determined magnitude may be indicative of a frequency amplitude of a particular frequency bin. In some examples, the computing device may calculate, based at least on the magnitude for each of the one or more frequency bins for the left input channel and the right input channel, a spectral summation. In some examples, the computing device may apply an exponential scaling function to rotate each of the one or more frequency bins for the left input channel and the right input channel. In some examples, the rotation may redistribute each of the one or more frequency bins across a multiple channel speaker array.

Step 506 includes, continuously mapping a magnitude for each of the one or more frequency bins to a panning coefficient indicative of a channel weight p_L[k] and p_R[k] or P[k] for extending the left input channel and the right input channel of the stereo signal.

Step 508 includes, generating, based at least on the continuous mapping and the panning coefficients p_L[k] and p_R[k] or P[k], an upmixed multi-channel time domain audio signal. In some examples, generation of the upmixed multi-channel time domain audio signal by the computing device may be additionally and/or alternatively based at least in part on utilizing the spectral summation and the exponential scaling function.

In some examples, the panning coefficient may be a signal-level independent scalar factor. In some examples, the panning coefficient may be indicative of a stereo localization within a sound field. In some examples, the panning coefficient assigned to one or more frequency bins for the left input channel may be reciprocal to a panning coefficient assigned to one or more of the frequency bins for the right input channel. In some examples, the computing device may invert the panning coefficient for each of the one or more frequency bins for the left input channel and the right input channel. In some examples, the magnitude for each of the one or more frequency bins for the left input channel and the right input channel, comprises a left magnitude, a right magnitude, or combinations thereof. In some examples, the phase comprises a left phase, a right phase, or combinations thereof.

In some implementations, the method 500 includes generating a two-dimensional positional distribution plotting frequency versus normalized magnitude for the transformed stereo signal to identify a position of the one or more frequency bins. In some examples, the position of the one or more frequency bins is expressed as an angle, such as an angle relative to a stereo center line. The two-dimensional positional distribution can be generated, for example, as a part of step 506.

In some implementations, the method 500 includes identifying multiple portions of the transformed stereo signal to be extracted, wherein each portion of the transformed stereo signal is identified based on a respective region of interest within the two-dimensional positional distribution, for example, as a part of step 506. In some implementations, the portions of the transformed stereo signal are identified to be extracted without regard to individual sound sources within the stereo signal, and in some implementations the multiple portions of the transformed stereo signal are identified based solely on a range of locations defined by frequency and positional coordinates relative to the two-dimensional positional distribution. For example, each of the multiple portions can be identified as frequency bins falling within a respective range of left-right locations in the two-dimensional positional distribution and without identifying individual sound sources represented in the two-dimensional positional distribution. In some implementations, the number of regions of interest is based on the number of the plurality of output components (e.g., a number of speakers that will receive the upmixed signal). In these and other implementations, the method 500 can include applying a filtering function to each respective region of interest to extract the multiple identified portions of the transformed stereo signal, wherein the filtering function attenuates the transformed stereo signal outside of the respective region of interest.

In some examples, the method 500 can include transforming each of the multiple identified portions of the transformed stereo signal into a time domain output signal to generate the upmixed multi-channel time domain audio signal, wherein the upmixed multi-channel time domain audio signal is used for playback in a multi-channel sound field via a plurality of output components, for example, as a part of step 508. In these and other implementations, the computing device may provide the upmixed multi-channel time domain audio signal to an audio playback device for playback, such as a stereo system or a surround sound system.

In some implementations, the method 500 includes generating a visual representation comprising the positions of the frequency bins in the set of frequency bins and positions of each of the identified portions of the transformed stereo signal in the multi-channel sound field. The visual representation can facilitate analysis of relative positions of the frequency bins and the identified portions of the transformed stereo signal in the multi-channel sound field. In these and other implementations, the method 500 can includes providing the visual representation for display in a user interface. In some examples, the method 500 can include modifying a characteristic of the multi-channel sound field in response to a user input via the user interface based on the relative positions of the frequency bins and the identified portions of the transformed stereo signal.

Figure 6:
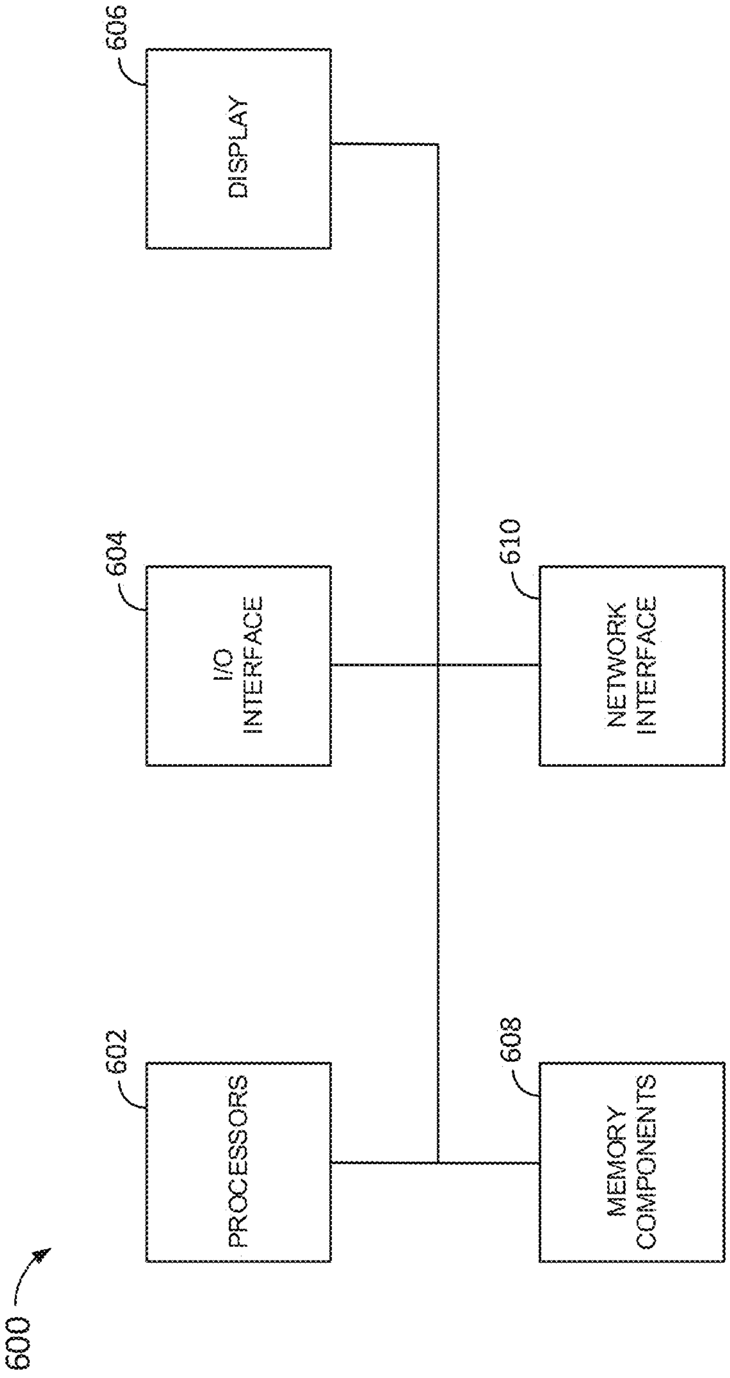
FIG. 6 illustrates an example computing system, in accordance with examples described herein.

Now turning to FIG. 6, FIG. 6 is a schematic diagram of an example computing system 600 for implementing various embodiments in the examples described herein. Computing system 600 may be used to implement the sound source 104, user device 116, computing device 108, or it may be integrated into one or more of the components of system 100, such as the user device 116 and/or computing device 108. Computing system 600 may be used to implement or execute one or more of the components or operations disclosed in FIGS. 1-5. In FIG. 6, computing system 600 may include one or more processors 602, an input/output (I/O) interface 604, a display 606, one or more memory components 608, and a network interface 610. Each of the various components may be in communication with one another through one or more buses or communication networks, such as wired or wireless networks.

Processors 602 may be implemented using generally any type of electronic device capable of processing, receiving, and/or transmitting instructions. For example, processors 602 may include or be implemented by a central processing unit, microprocessor, processor, microcontroller, or programmable logic components (e.g., FPGAs). Additionally, it should be noted that some components of computing system 600 may be controlled by a first processor and other components may be controlled by a second processor, where the first and second processors may or may not be in communication with each other.

Memory components 608 are used by computing system 600 to store instructions, such as executable instructions discussed herein, for the processors 602, as well as to store data, such as data and metadata associated with extending stereo fields to multi-channel formats and the like. Memory components 608 may be, for example, magneto-optical storage, read-only memory, random access memory, erasable programmable memory, flash memory, or a combination of one or more types of memory components.

Display 606 provides visual feedback to a user (e.g., listener, etc.), such as user interface elements displayed by user device 116. Optionally, display 606 may act as an input element to enable a user of a user device to view and/or manipulate features of the system 100 as described in the present disclosure. Display 606 may be a liquid crystal display, plasma display, organic light-emitting diode display, and/or other suitable display. In embodiments where display 606 is used as an input, display 606 may include one or more touch or input sensors, such as capacitive touch sensors, a resistive grid, or the like.

The I/O interface 604 allows a user to enter data into the computing system 600, as well as provides an input/output for the computing system 600 to communicate with other devices or services, of FIG. 1. I/O interface 604 can include one or more input buttons, touch pads, track pads, mice, keyboards, audio inputs (e.g., microphones), audio outputs (e.g., speakers), and so on.

Network interface 610 provides communication to and from the computing system 600 to other devices. For example, network interface 610 may allow user device 116 to communicate with computing device 108 through a communication network. Network interface 610 includes one or more communication protocols, such as, but not limited to WiFi, Ethernet, Bluetooth, cellular data networks, and so on. Network interface 610 may also include one or more hardwired components, such as a Universal Serial Bus (USB) cable, or the like. The configuration of network interface 610 depends on the types of communication desired and may be modified to communicate via Wi-Fi, Bluetooth, and so on.

Figure 7:
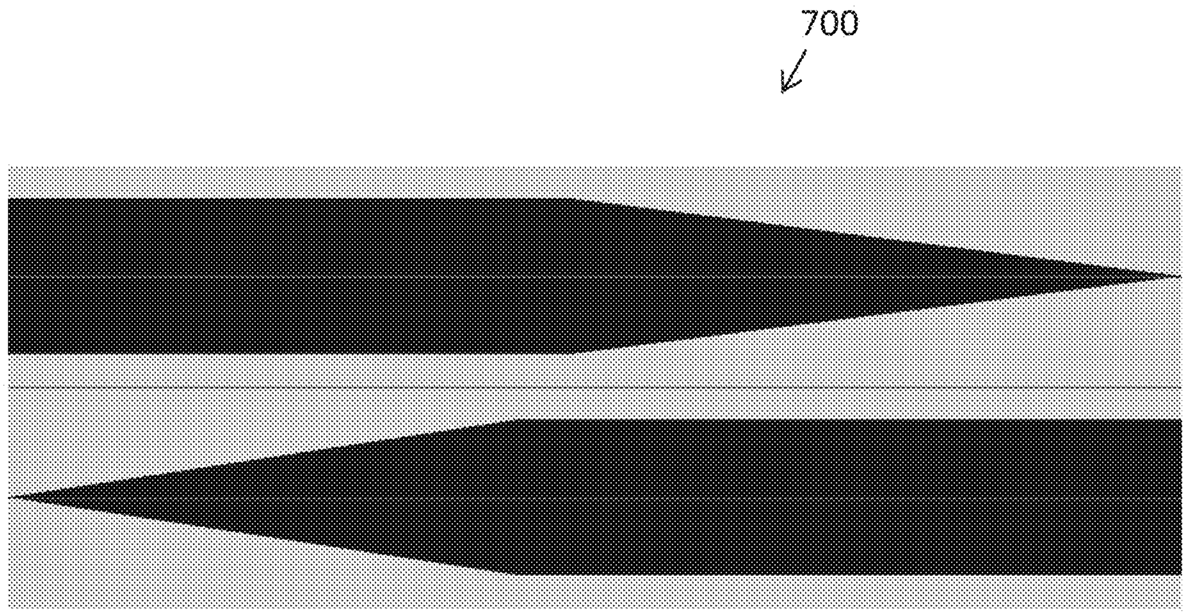
FIG. 7 is a graph illustrating a test input file, in accordance with examples described herein.
Figure 8:
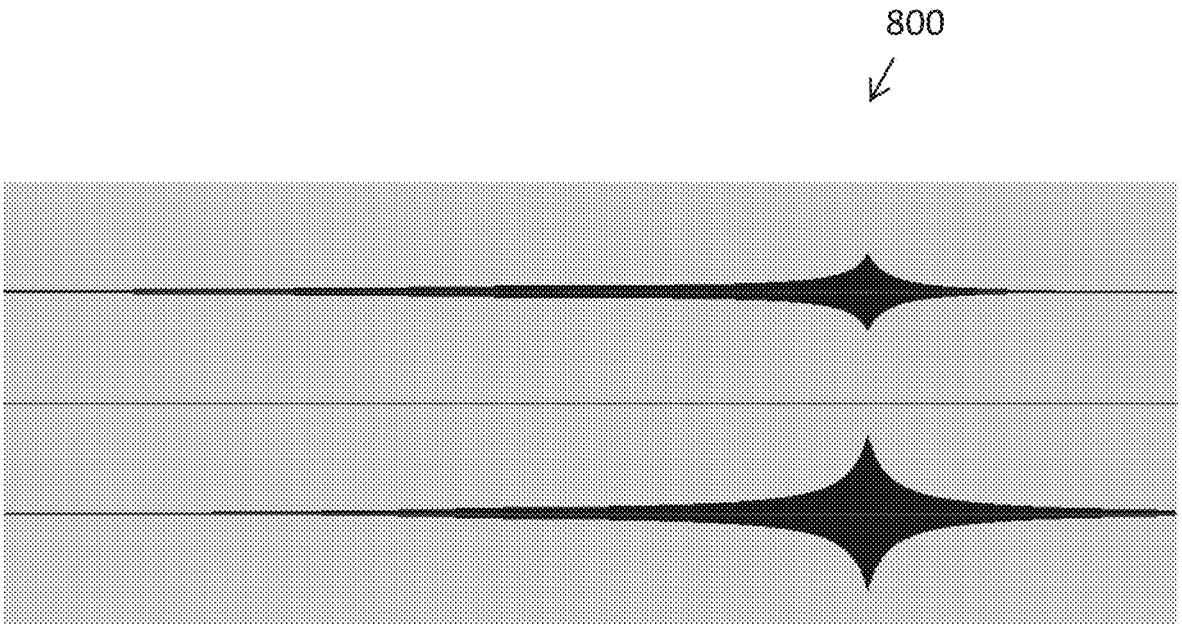
FIG. 8 is a graph illustrating an output generated by the disclosed system, in accordance with examples described herein.
Figure 9:
FIG. 9 is a graph illustrating an output generated by the disclosed system, in accordance with examples described herein.

Now turning to FIG. 7, FIG. 7 is a graph 700 illustrating a test input file, in accordance with examples described herein. FIG. 7, together with FIGS. 8 and 9, illustrate principles of the disclosed technology related to a process known as Independent Component Analysis (ICA), which attempts to characterize a mix as an addition of a plurality of individual sound sources, each differentiated by their statistical distribution. The technology disclosed herein can use principles related to ICA to generate upmixed audio, such as upmixed multi-channel time domain audio signals, as described herein.

In a common scenario described as the "cocktail party problem" the sounds from a room with two speakers talking simultaneously is picked up by two microphones, which record signals x1(t) and x2(t), x1 and x2 denoting the recorded amplitudes at time index t. Since the microphones are placed in an arbitrary position in the room and typically not directly in front of each speaker these amplitudes consist of a weighed sum of the two speakers s1 and s2. This situation can be expressed this as the linear equation:

$$x1(t) = a\_11 * s1(t) + a\_12 * s2(t) \qquad \text{Equation (1')}$$

$$x2(t) = a\_21 * s1(t) + a\_22 * s2(t)$$

If parameters a_11, a_12, a_21, a_22 could be estimated, which only depend on the distance between the speaker and the microphone, this equation could be solved in order to isolate the individual source signals.

A priori knowledge of a_ij would enable the equation to be solved by classical methods. However in practice it is unlikely that the parameters are known beforehand, so they need to be estimated from the statistical properties of s1 and s2. Since they are two different sound sources it can be assumed that at each time instant t they may be statistically independent as they were created by two separate processes. Even though this is a simplification, in practice there is often sufficient independence to solve the above equation for all practical purposes as is evident from the literature and prior art.

The technology disclosed herein follows the same logic to achieve the inverse. Instead of determining the individual sources within the mix from signals x1 and x2 the disclosed technology strives to find a new weighted sum that we call y1 and y2 such that they represent the mixture x1 and x2 as if the microphones would be situated at a position where y1 and y2 was recorded. In other words, the disclosed technology attempts to move the position of the microphones from position where x1, x2 was recorded to a position where y1, y2 was recorded, had the microphones initially been in another position:

$$y1(t) = b\_11 * x1 + b\_12 * x2 \qquad \text{Equation (2')}$$

$$y2(t) = b\_21 * x1 + b\_22 * x2$$

A straightforward solution would be to identify s1, s2 using ICA and then apply b_11, b_12, b_21 and b_22 to re-mix the individual sources to yield y1 and y2. There exist at least four distinct problems that may prevent this.

A first problem is that, in a stereo mix, there are usually more sources than the two channels x1, x2 that are available to solve for them. It is thus an underdetermined problem.

A second problem is that the exact number of sound sources can vary with time and is generally unknown beforehand.

A third problem is that calculating parameters a_ij requires knowledge of the sources' s1, s2 statistical distributions, which can be complicated to compute and may require a high amount of recorded samples from x1, x2 to fully ascertain.

A fourth problem is that the disclosed technology may require more microphone positions (y_n) than there are recorded mixtures (x_n).

As is evident, the first and second problems discussed above inherently limit success using ICA directly. The third problem discussed above requires a workaround to ensure sufficient orthogonalization of the domain to allow determining an approximate weight matrix for all sound sources without accumulating a lot of data. One such method involves the Short-Term Fourier Transform to transform x1, x2 into a plurality of magnitudes and phases.

The technology disclosed herein operates in the magnitude domain, which has several advantages that are similar to the statistical independence used by ICA in the time domain, as summarized in Table 1 below.

TABLE 1

| Disclosed Technology | ICA |
|---|---|
| Independent sources rarely overlap in the magnitude spectrum and typically share only a few bins in the magnitude domain. | Independent sources typically have different distributions. |
| It is possible to assign stereo location information to each source as long as there is no significant overlap. | It is possible to estimate parameters a_ij from the mix provided not more than one source has a Gaussian distribution |
| Parameters b_ij can be estimated from a whitened, thus orthogonalised representation using magnitudes from left and right channels. | Parameters a_ij are typically estimated from a whitened, thus orthogonalised representation to reduce the dimensionality of the problem. |

To address the fourth problem discussed above, the disclosed technology includes first defining a two dimensional plane (x'1, x'2) that represents x1, x2 in a whitened, orthogonalised manner, as in the below equation:

$$c(t) = |x1(t)| + |x2(t)| \quad \text{Equation (3')}$$

$$x'1(t) = |x1(t)|/c(t)$$

$$x'2(t) = |x2(t)|/c(t);\ \text{for every } c \neq 0$$

The foregoing equation gives access to the normalized position of each sample at time instance t within the x1, x2 stereo field. Translated into the magnitude domain M at bin k and time index t, this transformation can be represented using the below equation:

$$c(k, t) = M1(k, t) + M2(k, t) \quad \text{Equation (4')}$$

$$M'1(k, t) = M1(k, t)/c(k, t)$$

$$M'2(k, t) = M2(k, t)/c(k, t);\ \text{for every } c \neq 0$$

This normalizing operation distributes the location information uniformly across the 2D plane spanned by M'1, M'2 for each k and t, with zero value denoting far-left and unity value denoting far-right. The signal magnitudes P1, P2 can now be expressed at anew virtual microphone located at position L (0 . . . 1) within the stereo field using the following equation:

$$L1(k, t) = M'1(k, t) - 1 + L; \quad \text{Equation (5')}$$

-continued $$L2(k, t) = M'2(k, t) - L;$$

$$D(k, t) = sqrt(L1(k, t)^{}2 + L2(k, t)^{}2)$$

$$P1(k, t) = M1(k, t)/(1. + s * D(k, t))$$

$$P2(k, t) = M2(k, t)/(1. + s * D(k, t))$$

Parameter s denotes a sensitivity factor that determines how wide the "field of view" of the virtual microphone will be. The common term 1./(1+s*D) could be replaced by a custom mapping function, an exponential function E that provides an exponential falloff as the position of the sound source in the mix gets farther away from the virtual microphone, or a threshold function that cuts off all sound outside a specific region of interest, as described herein. For example, such a function can be a filtering function (e.g., a mask or aperture) that is applied to a region of interest to extract a portion of a stereo signal (e.g., a transformed stereo signal).

In some implementations, Equations (3'), (4'), and (5') can be conflated into one single equation that applies parameter whitening and remapping of the sound sources to the virtual microphone in one single sequence of operations in the Fourier magnitude domain, such as in the following equation:

$$M\_sum[k] = (M\_left[k] + M\_right[k])/2 \quad \text{Equation (6')}$$

The foregoing yields total sum of the stereo signals' magnitudes as follows:

$$p\_L[k] = (M\_left[k] - M\_sum[k])/M\_sum[k]; \quad (M\_sum[k]\,! = 0) \quad \text{Equation (7a')}$$

$$p\_R[k] = (M\_right[k] - M\_sum[k])/M\_sum[k]; \quad (M\_sum[k]\,! = 0) \quad \text{Equation (7b')}$$

This further yields a normalized panning position at bin k as follows:

$$M\_left\_ex[k] = M\_sum[k] * (1 - |p\_L[k]|^{\wedge}E) \quad \text{Equation (8')}$$

$$M\_right\_ex[k] = M\_sum[k] * (1 - |p\_R[k]|^{\wedge}E) \quad \text{Equation (9')}$$

The foregoing further yields yielding virtual microphone signal magnitudes M_left_ex, M_right_ex for the surround channels.

Based on the foregoing, the graph 700 of FIG. 7 illustrates a plot of Equation (5') above, wherein an upper portion of the graph 700 represents a left channel and a lower portion of the graph 700 represents a right channel.

Turning now to FIG. 8, FIG. 8 is a graph 800 that illustrates an output generated by the disclosed system, in accordance with examples described herein. For example, the graph 800 can represent an output of the disclosed system according to Equation (5'), wherein L=0.667 and s=200, where L represents a position and s represents a sensitivity factor that determines how wide the "field of view" of the virtual microphone will be.

Turning now to FIG. 9, FIG. 9 is a graph 900 that illustrates an output generated by the disclosed system, in accordance with examples described herein. For example, the graph 900 can represent an output of the disclosed system according to Equation (5'), wherein L=0.667 and s=50.

Together, the graphs 700, 800, and 900 illustrate the filtering function, such as the mask or aperture, that the disclosed technology uses to extract sounds within a region of interest (e.g., a left-right position in a sound field). Additionally, the graphs 700, 800, and 900 can be provided as an output of the disclosed system to facilitate analysis of regions of interest and portions of an upmixed signal.

Figure 10:
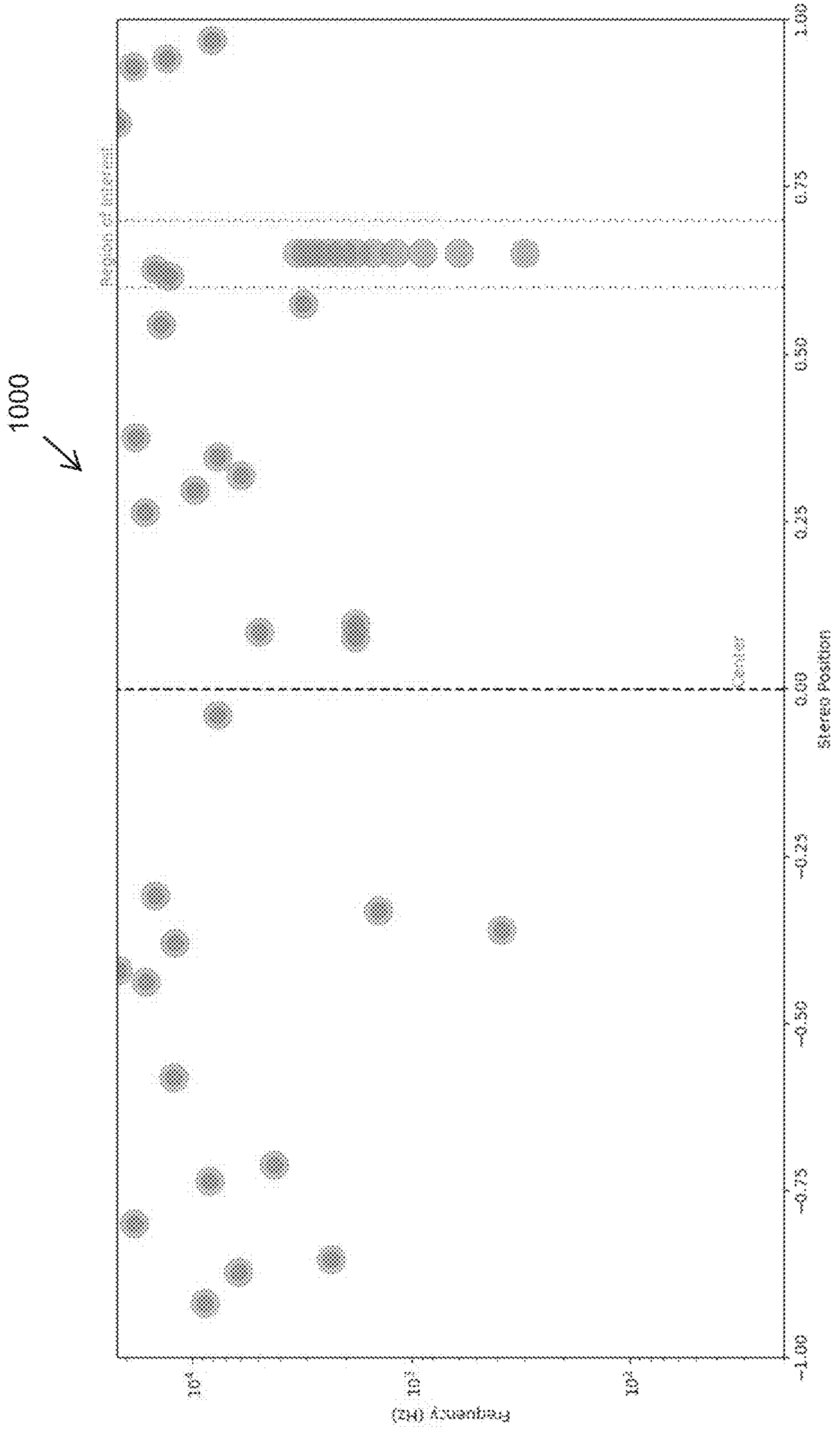
FIG. 10 is a plot illustrating a visualization that can be generated by the disclosed system, in accordance with examples described herein.

Turning now to FIG. 10, FIG. 10 is a plot 1000 illustrating a visualization that can be generated by the disclosed system, in accordance with examples described herein. The visualization can comprise positions, such as stereo positions, of frequency bins, which are represented as dots. Additionally, the visualization can indicate a frequency of the bins. The visualization can also indicate positions, such as stereo positions, of one or more regions of interest. Each region of interest can include a range of stereo positions, and one or more frequency bins can be contained in each region of interest. As described herein, a region of interest can correspond to a portion of a stereo signal to be extracted, such as by using a filtering function. The extracted portions of the stereo signal are then used to generate an upmixed multi-channel time domain audio signal. For example, each region of interest can correspond to a portion of the stereo signal that is extracted and used to provide a corresponding portion of the upmixed signal to a corresponding speaker.

The visualization illustrated in the plot 1000 can facilitate analysis of relative positions of the frequency bins and the identified portions of the transformed stereo signal in the multichannel sound field, relative to regions of interest. For example, the visualization can allow a user to see concentrations of frequency bins in different left-right locations and how those concentrations correspond to portions of an upmixed signal, such as specific portions that are provided to different speakers.

In some implementations, the visualization can be provided for display in a user interface provided by the disclosed system. In these and other implementations, various inputs can be provided via the user interface to modify a characteristic of a multi-channel sound field. For example, the visualization can be displayed in the user interface to allow a user to visualize portions of a stereo signal that are included in respective regions of interest in an upmixed signal, which can each correspond to different speakers to which the upmixed signal is provided. By providing one or more inputs via the user interface, a user can change characteristics of the upmixed signal, such as by dragging a left or right boundary of a region of interest, thereby including more or fewer bins within the region of interest.

The description of certain embodiments included herein is merely exemplary in nature and is in no way intended to limit the scope of the disclosure or its applications or uses. In the included detailed description of embodiments of the present systems and methods, reference is made to the accompanying drawings which form a part hereof, and which are shown by way of illustration specific to embodiments in which the described systems and methods may be practiced. These embodiments are described in sufficient detail to enable those skilled in the art to practice presently disclosed systems and methods, and it is to be understood that other embodiments may be utilized, and that structural and logical changes may be made without departing from the spirit and scope of the disclosure. Moreover, for the purpose of clarity, detailed descriptions of certain features will not be discussed when they would be apparent to those with skill in the art so as not to obscure the description of embodiments of the disclosure. The included detailed description is therefore not to be taken in a limiting sense, and the scope of the disclosure is defined only by the appended claims.

From the foregoing it will be appreciated that, although specific embodiments of the invention have been described herein for purposes of illustration, various modifications may be made without deviating from the spirit and scope of the invention.

The particulars shown herein are by way of example and for purposes of illustrative discussion of the preferred embodiments of the present invention only and are presented in the cause of providing what is believed to be the most useful and readily understood description of the principles and conceptual aspects of various embodiments of the invention. In this regard, no attempt is made to show structural details of the invention in more detail than is necessary for the fundamental understanding of the invention, the description taken with the drawings and/or examples making apparent to those skilled in the art how the several forms of the invention may be embodied in practice.

As used herein and unless otherwise indicated, the terms "a" and "an" are taken to mean "one", "at least one" or "one or more". Unless otherwise required by context, singular terms used herein shall include pluralities and plural terms shall include the singular.

Unless the context clearly requires otherwise, throughout the description and the claims, the words 'comprise', 'comprising', and the like are to be construed in an inclusive sense as opposed to an exclusive or exhaustive sense; that is to say, in the sense of "including, but not limited to". Words using the singular or plural number also include the plural and singular number, respectively. Additionally, the words "herein," "above," and "below" and words of similar import, when used in this application, shall refer to this application as a whole and not to any particular portions of the application.

Of course, it is to be appreciated that any one of the examples, embodiments or processes described herein may be combined with one or more other examples, embodiments and/or processes or be separated and/or performed amongst separate devices or device portions in accordance with the present systems, devices and methods.

Finally, the above discussion is intended to be merely illustrative of the present system and should not be construed as limiting the appended claims to any particular embodiment or group of embodiments. Thus, while the present system has been described in particular detail with reference to exemplary embodiments, it should also be appreciated that numerous modifications and alternative embodiments may be devised by those having ordinary skill in the art without departing from the broader and intended spirit and scope of the present system as set forth in the claims that follow. Accordingly, the specification and drawings are to be regarded in an illustrative manner and are not intended to limit the scope of the appended claims.

Aspects and features of the present disclosure are set out in the following first set of numbered clauses.

1. A method comprising:
   receiving a stereo signal containing a left input channel and a right input channel;
   transforming, based at least on a short-time Fast Fourier Transform (s-t FFT), windowed overlapping sections of the stereo signal containing the left input channel and the right input channel to generate a set of frequency bins for the left input channel and the right input channel;
   generating a two-dimensional positional distribution plotting frequency versus normalized magnitude for the transformed stereo signal to identify a position in a left-right plane of each frequency bin in the set of frequency bins;
   identifying multiple portions of the transformed stereo signal to be extracted, wherein each portion of the transformed stereo signal is identified based on a respective region of interest within the two-dimensional positional distribution;
   applying a filtering function to each respective region of interest to extract the multiple identified portions of the transformed stereo signal, wherein the filtering function attenuates the transformed stereo signal outside of the respective region of interest; and
   transforming each of the multiple identified portions of the transformed stereo signal into a time domain output signal to generate an upmixed multi-channel time domain audio signal, wherein the upmixed multi-channel time domain audio signal is used for playback in a multi-channel sound field via a plurality of output components.
2. The method of clause 1, wherein the identified position of each frequency bin is expressed as an angle relative to a stereo center line.
3. The method of clause 1, wherein the multiple identified portions of the transformed stereo signal are extracted without regard to individual sound sources within the stereo signal.
4. The method of clause 1, wherein the multiple portions of the transformed stereo signal are identified based solely on a range of locations defined by frequency and positional coordinates relative to the two-dimensional positional distribution.
5. The method of clause 1, wherein a number of the regions of interest is based on a number of the plurality of output components.
6. The method of clause 1, further comprising:
   generating a visual representation comprising the positions of the frequency bins in the set of frequency bins and positions of each of the identified portions of the transformed stereo signal in the multi-channel sound field, wherein the visual representation is generated to facilitate analysis of relative positions of the frequency bins and the identified portions of the transformed stereo signal in the multi-channel sound field; and
   providing the visual representation for display in a user interface.
7. The method of clause 6, further comprising:
   modifying a characteristic of the multi-channel sound field in response to a user input via the user interface based on the relative positions of the frequency bins and the identified portions of the transformed stereo signal.
8. The method of clause 1, further comprising:
   providing the upmixed multi-channel time domain audio signal to an audio playback device for playback.
9. The method of clause 1, further comprising:
   determining, for each frequency bin in the set of frequency bins, a magnitude, a phase, or combinations thereof, wherein the magnitude is indicative of a frequency amplitude of a frequency bin.
10. The method of clause 9, further comprising:
   calculating, based at least on the magnitude for each frequency bin in the set of frequency bins, a spectral summation.
11. The method of clause 1, wherein the stereo signal containing the left input channel and the right input channel is a recorded signal received from a database.
12. The method of clause 1, wherein the stereo signal containing the left input channel and the right input channel is a live-stream signal received in near real-time from a live event.
13. A non-transitory computer-readable medium carrying instructions that, when executed by at least one processor, cause a computing system to perform operations comprising:
   receiving a stereo signal containing a left input channel and a right input channel;
   transforming, based at least on a short-time Fast Fourier Transform (s-t FFT), windowed overlapping sections of the stereo signal containing the left input channel and the right input channel to generate a set of frequency bins for the left input channel and the right input channel;
   generating a two-dimensional positional distribution plotting frequency versus normalized magnitude for the transformed stereo signal to identify a position in a left-right plane of each frequency bin in the set of frequency bins;
   identifying multiple portions of the transformed stereo signal to be extracted, wherein each portion of the transformed stereo signal is identified based on a respective region of interest within the two-dimensional positional distribution;
   applying a filtering function to each respective region of interest to extract the multiple identified portions of the transformed stereo signal, wherein the filtering function attenuates the transformed stereo signal outside of the respective region of interest; and
   transforming each of the multiple identified portions of the transformed stereo signal into a time domain output signal to generate an upmixed multi-channel time domain audio signal, wherein the upmixed multi-channel time domain audio signal is used for playback in a multi-channel sound field via a plurality of output components.
14. The non-transitory computer-readable medium of clause 13, wherein the identified position of each frequency bin is expressed as an angle relative to a stereo center line.
15. The non-transitory computer-readable medium of clause 13, wherein the multiple identified portions of the transformed stereo signal are extracted without regard to individual sound sources within the stereo signal.

16. The non-transitory computer-readable medium of clause 13, wherein the multiple portions of the transformed stereo signal are identified based solely on a range of locations defined by frequency and positional coordinates relative to the two-dimensional positional distribution.

17. The non-transitory computer-readable medium of clause 13, wherein a number of the regions of interest is based on a number of the plurality of output components.

18. The non-transitory computer-readable medium of clause 13, wherein the operations further comprise:
- generating a visual representation comprising the positions of the frequency bins in the set of frequency bins and positions of each of the identified portions of the transformed stereo signal in the multi-channel sound field, wherein the visual representation is generated to facilitate analysis of relative positions of the frequency bins and the identified portions of the transformed stereo signal in the multi-channel sound field; and
- providing the visual representation for display in a user interface.

19. The non-transitory computer-readable medium of clause 18, wherein the operations further comprise:
- modifying a characteristic of the multi-channel sound field in response to a user input via the user interface based on the relative positions of the frequency bins and the identified portions of the transformed stereo signal.

20. The non-transitory computer-readable medium of clause 13, wherein the operations further comprise:
- providing the upmixed multi-channel time domain audio signal to an audio playback device for playback.

21. The non-transitory computer-readable medium of clause 13, wherein the operations further comprise:
- determining, for each frequency bin in the set of frequency bins, a magnitude, a phase, or combinations thereof, wherein the magnitude is indicative of a frequency amplitude of a frequency bin.

22. The non-transitory computer-readable medium of clause 21, wherein the operations further comprise:
- calculating, based at least on the magnitude for each frequency bin in the set of frequency bins, a spectral summation.

23. The non-transitory computer-readable medium of clause 13, wherein the stereo signal containing the left input channel and the right input channel is a recorded signal received from a database.

24. The non-transitory computer-readable medium of clause 13, wherein the stereo signal containing the left input channel and the right input channel is a live-stream signal received in near real-time from a live event.

Aspects and features of the present disclosure are also set out in the following second set of numbered clauses.

1. A method comprising:
- receiving a stereo signal containing a left input channel and a right input channel;
- transforming, based at least on a short-time Fast Fourier Transform (s-t FFT), one or more windowed, overlapping sections of the stereo signal containing the left input channel and the right input channel, to generate one or more frequency bins for the left input channel and the right input channel;
- continuously mapping a magnitude for each of the one or more frequency bins to a panning coefficient indicative of a channel weight for extending the left input channel and the right input channel of the stereo signal to a multi-channel sound field; and
- generating, based at least on the continuous mapping and the panning coefficient, an upmixed multi-channel time domain audio signal, wherein the upmixed multi-channel time domain audio signal is used for playback in the multi-channel sound field.

2. The method of clause 1, further comprising:
- determining, for each of the one or more frequency bins for the left input channel and the right input channel, the magnitude, a phase, or combinations thereof, wherein the magnitude is indicative of a frequency amplitude of a frequency bin.

3. The method of clause 2, wherein the phase comprises a left phase, a right phase, or combinations thereof.

4. The method of any of clauses 2 to 3, further comprising:
- calculating, based at least on the magnitude for each of the one or more frequency bins for the left input channel and the right input channel, a spectral summation.

5. The method of clause 4, further comprising:
- applying an exponential scaling function to rotate each of the one or more frequency bins for the left input channel and the right input channel, wherein the rotation redistributes each of the one or more frequency bins across a multiple channel speaker array; and
- generating, based at least on utilizing the spectral summation and the exponential scaling function, the upmixed multi-channel time domain audio signal.

6. The method of any preceding clause, wherein the panning coefficient is a signal-level independent scalar factor.

7. The method of any preceding clause, wherein a panning coefficient assigned to one or more frequency bins for the left input channel is reciprocal to a panning coefficient assigned to one or more of the frequency bins for the right input channel.

8. The method of any preceding clause, wherein the panning coefficient is indicative of a stereo localization within a sound field.

9. The method of any preceding clause, further comprising:
- inverting the panning coefficient for each of the one or more frequency bins for the left input channel and the right input channel.

10. The method of any preceding clause, wherein the magnitude for each of the one or more frequency bins for the left input channel and the right input channel, comprises a left magnitude, a right magnitude, or combinations thereof.

11. The method of any preceding clause, wherein the stereo signal containing the left input channel and the right input channel is a recorded signal received from a database.

12. The method of any preceding clause, wherein the stereo signal containing the left input channel and the right input channel is a live-stream signal received in near real-time from a live event.

13. A computer readable storage medium including instructions that, when executed by at least one processor of a computing system, cause the computing system to perform a method comprising:
- transforming, utilizing a short-time Fast Fourier Transform (s-t FFT), a received stereo signal containing a left input channel and a right input channel, to generate a plurality of frequency bins for the left input channel and the right input channel;
- continuously mapping a magnitude for each of the plurality of frequency bins to a panning coefficient indicative of a channel weight for extending the left input channel and the right input channel of the stereo signal to a multi-channel sound field; and
- generating, based at least on the continuous mapping and the panning coefficient, an upmixed multi-channel time domain audio signal, wherein the upmixed multi-channel time domain audio signal is used for playback in the multi-channel sound field.

14. The computer readable storage medium of clause 13, wherein the method further comprises determining, for each of the plurality of frequency bins for the left input channel and the right input channel, the magnitude, a phase, or combinations thereof, wherein the magnitude is indicative of a frequency amplitude of a frequency bin.

15. The computer readable storage medium of clause 14, wherein the method further comprises calculating, based at least on the magnitude for each of the plurality of frequency bins for the left input channel and the right input channel, a spectral summation.

16. The computer readable storage medium of clause 15, wherein the method further comprises:

applying an exponential scaling function to rotate each of the plurality of frequency bins for the left input channel and the right input channel, wherein the rotation redistributes each of the plurality of frequency bins across a multiple channel speaker array; and generating, based at least on utilizing the spectral summation and the exponential scaling function, the upmixed multi-channel time domain audio signal.

17. The computer readable storage medium of any of clauses 13 to 16, wherein a panning coefficient assigned to one or more frequency bins for the left input channel is reciprocal to a panning coefficient assigned to one or more of the frequency bins for the right input channel.

18. The computer readable storage medium of any of clauses 13 to 17, wherein the panning coefficient is indicative of a stereo localization within a sound field.

19. The computer readable storage medium of any of clauses 13 to 18, wherein the stereo signal containing the left input channel and the right input channel is a recorded signal received from a database.

20. The computer readable storage medium of any of clauses 13 to 19, wherein the stereo signal containing the left input channel and the right input channel is a live-stream signal received in near real-time from a live event.

21. A method comprising:

transforming, utilizing a short-time Fast Fourier Transform (s-t FFT), a received stereo signal containing a left input channel and a right input channel, to generate a plurality of frequency bins for the left input channel and the right input channel;

continuously mapping a magnitude for each of the plurality of frequency bins to a panning coefficient indicative of a channel weight for extending the left input channel and the right input channel of the stereo signal to a multi-channel sound field; and generating, based at least on the continuous mapping and the panning coefficient, an upmixed multi-channel time domain audio signal, wherein the upmixed multi-channel time domain audio signal is used for playback in the multi-channel sound field.

22. A computing system configured to perform the method of any of clauses 1 to 12 or 21.

23. A computer readable storage medium including instructions that, when executed by at least one processor of a computing system, cause the computing system to perform the method of any of clauses 1 to 12 or 21.

The invention claimed is:

1. A method comprising:

receiving a stereo signal containing a left input channel and a right input channel;

transforming, based at least on a short-time Fast Fourier Transform (s-t FFT), windowed overlapping sections of the stereo signal containing the left input channel and the right input channel to generate a set of frequency bins for the left input channel and the right input channel;

generating a two-dimensional positional distribution plotting frequency versus normalized magnitude for the transformed stereo signal to identify a position in a left-right plane of each frequency bin in the set of frequency bins;

identifying multiple portions of the transformed stereo signal to be extracted, wherein each portion of the transformed stereo signal is identified based on a respective region of interest within the two-dimensional positional distribution plotting frequency versus normalized magnitude;

applying a filtering function to each respective region of interest to extract the multiple identified portions of the transformed stereo signal, wherein the filtering function attenuates the transformed stereo signal outside of the respective region of interest;

transforming each of the multiple identified portions of the transformed stereo signal into a time domain output signal to generate an upmixed multi-channel time domain audio signal, wherein the upmixed multi-channel time domain audio signal is used for playback in a multi-channel sound field via a plurality of output components;

generating a visual representation comprising the positions of the frequency bins in the set of frequency bins and positions of each of the identified portions of the transformed stereo signal in the multi-channel sound field, wherein the visual representation is generated to facilitate analysis of relative positions of the frequency bins and the identified portions of the transformed stereo signal in the multi-channel sound field;

providing the visual representation for display in a user interface; and modifying a characteristic of the multi-channel sound field in response to a user input via the user interface based on the relative positions of the frequency bins and the identified portions of the transformed stereo signal.

2. The method of claim 1, wherein the identified position of each frequency bin is expressed as an angle relative to a stereo center line.

3. The method of claim 1, wherein the multiple identified portions of the transformed stereo signal are extracted without regard to individual sound sources within the stereo signal.

4. The method of claim 1, wherein the multiple portions of the transformed stereo signal are identified based solely on a range of locations defined by frequency and positional coordinates relative to the two-dimensional positional distribution.

5. The method of claim 1, wherein a number of the regions of interest is based on a number of the plurality of output components.

6. The method of claim 1, further comprising:

providing the upmixed multi-channel time domain audio signal to an audio playback device for playback.

7. The method of claim 1, further comprising:

determining, for each frequency bin in the set of frequency bins, a magnitude, a phase, or combinations thereof, wherein the magnitude is indicative of a frequency amplitude of a frequency bin.

8. The method of claim 7, further comprising:
calculating, based at least on the magnitude for each frequency bin in the set of frequency bins, a spectral summation.

9. The method of claim 1, wherein the stereo signal containing the left input channel and the right input channel is a recorded signal received from a database.

10. The method of claim 1, wherein the stereo signal containing the left input channel and the right input channel is a live-stream signal received in near real-time from a live event.

11. A computer-readable medium carrying instructions that, when executed by at least one processor, cause a computing system to perform operations comprising:
receiving a stereo signal containing a left input channel and a right input channel;
transforming, based at least on a short-time Fast Fourier Transform (s-t FFT), windowed overlapping sections of the stereo signal containing the left input channel and the right input channel to generate a set of frequency bins for the left input channel and the right input channel;
generating a two-dimensional positional distribution plotting frequency versus normalized magnitude for the transformed stereo signal to identify a position in a left-right plane of each frequency bin in the set of frequency bins;
identifying multiple portions of the transformed stereo signal to be extracted, wherein each portion of the transformed stereo signal is identified based on a respective region of interest within the two-dimensional positional distribution plotting frequency versus normalized magnitude;
applying a filtering function to each respective region of interest to extract the multiple identified portions of the transformed stereo signal, wherein the filtering function attenuates the transformed stereo signal outside of the respective region of interest;
transforming each of the multiple identified portions of the transformed stereo signal into a time domain output signal to generate an upmixed multi-channel time domain audio signal, wherein the upmixed multi-channel time domain audio signal is used for playback in a multi-channel sound field via a plurality of output components;
generating a visual representation comprising the positions of the frequency bins in the set of frequency bins and positions of each of the identified portions of the transformed stereo signal in the multi-channel sound field, wherein the visual representation is generated to facilitate analysis of relative positions of the frequency bins and the identified portions of the transformed stereo signal in the multi-channel sound field;
providing the visual representation for display in a user interface; and
modifying a characteristic of the multi-channel sound field in response to a user input via the user interface based on the relative positions of the frequency bins and the identified portions of the transformed stereo signal.

12. The computer-readable medium of claim 11, wherein the identified position of each frequency bin is expressed as an angle relative to a stereo center line.

13. The computer-readable medium of claim 11, wherein the multiple identified portions of the transformed stereo signal are extracted without regard to individual sound sources within the stereo signal.

14. The computer-readable medium of claim 11, wherein the multiple portions of the transformed stereo signal are identified based solely on a range of locations defined by frequency and positional coordinates relative to the two-dimensional positional distribution.

15. The computer-readable medium of claim 11, wherein a number of the regions of interest is based on a number of the plurality of output components.

16. The computer-readable medium of claim 11, wherein the operations further comprise:
providing the upmixed multi-channel time domain audio signal to an audio playback device for playback.

17. The computer-readable medium of claim 11, wherein the operations further comprise:
determining, for each frequency bin in the set of frequency bins, a magnitude, a phase, or combinations thereof, wherein the magnitude is indicative of a frequency amplitude of a frequency bin.

18. The computer-readable medium of claim 17, wherein the operations further comprise:
calculating, based at least on the magnitude for each frequency bin in the set of frequency bins, a spectral summation.

19. The computer-readable medium of any of claim 11, wherein the stereo signal containing the left input channel and the right input channel is one of a recorded signal received from a database or a live-stream signal received in near real-time from a live event.

* * * * *